United States Patent
Fujimoto et al.

(10) Patent No.: US 8,166,933 B2
(45) Date of Patent: May 1, 2012

(54) POWER UNIT FOR SMALL-SIZED VEHICLE

(75) Inventors: Yasushi Fujimoto, Saitama (JP); Atsushi Ogasawara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 12/679,625

(22) PCT Filed: Sep. 26, 2008

(86) PCT No.: PCT/JP2008/067411
§ 371 (c)(1), (2), (4) Date: Mar. 23, 2010

(87) PCT Pub. No.: WO2009/044669
PCT Pub. Date: Apr. 9, 2009

(65) Prior Publication Data
US 2010/0206253 A1 Aug. 19, 2010

(30) Foreign Application Priority Data

Sep. 29, 2007 (JP) ................ 2007-256959
Sep. 29, 2007 (JP) ................ 2007-256960

(51) Int. Cl.
*F01L 9/02* (2006.01)
*F02B 75/32* (2006.01)

(52) U.S. Cl. ............ 123/90.12; 123/90.16; 123/197.5; 123/196 A

(58) Field of Classification Search ............ 123/90.12, 123/90.31, 90.15, 90.16, 90.17, 197.5, 196 R, 123/196 A, 196 M, 196 C
See application file for complete search history.

(56) References Cited

U.S. PATENT DOCUMENTS

| | | | |
|---|---|---|---|
| 6,045,338 | A | 4/2000 | Morita |
| 6,244,385 | B1 | 6/2001 | Tsubata et al. |
| 6,598,705 | B2 | 7/2003 | Ito et al. |
| 7,210,454 | B2 | 5/2007 | Maehara et |
| 7,267,094 | B2 * | 9/2007 | Tawarada et al. ........ 123/196 M |
| 7,331,323 | B2 | 2/2008 | Hara |
| 7,395,798 | B2 | 7/2008 | Matsuda |
| 7,434,561 | B2 | 10/2008 | Suzuki et al. |
| 7,730,800 | B2 | 6/2010 | Sorani et al. |
| 2006/0096798 | A1 | 5/2006 | Yamada et al. |
| 2006/0174848 | A1 | 8/2006 | Matsuda |
| 2007/0044744 | A1 | 3/2007 | Kono et al. |

(Continued)

FOREIGN PATENT DOCUMENTS

EP 1 632 664 A1 3/2006
(Continued)

*Primary Examiner* — Hai Huynh
(74) *Attorney, Agent, or Firm* — Carrier Blackman & Associates, P.C.; Joseph P. Carrier; William D. Blackman

(57) ABSTRACT

A power unit for a small-sized vehicle that includes a valve operating system equipped with a hydraulic valve operation mode change mechanism capable of changing the operational mode of an engine valve, and a clutch device disposed between a crankshaft and a shift mechanism so as to switch hydraulically between connection and disconnection of power transmission, wherein a discharge outlet of one oil pump (209) driven by power transmission from the crankshaft is connected in common to a valve operation mode change mechanisms (63, 64) and a clutch device (102). This enables the hydraulic system to be made compact while avoiding any increase in the overall bulk of the power unit, thus providing a power unit suitable for a small-sized vehicle.

5 Claims, 15 Drawing Sheets

U.S. PATENT DOCUMENTS

| | | | |
|---|---|---|---|
| 2008/0060606 A1* | 3/2008 | Inui et al. | 123/196 A |
| 2009/0107429 A1* | 4/2009 | Maehara et al. | 123/90.12 |
| 2009/0107750 A1* | 4/2009 | Maehara et al. | 180/219 |

FOREIGN PATENT DOCUMENTS

| | | |
|---|---|---|
| EP | 1 826 053 A1 | 8/2007 |
| JP | 51-10238 | 1/1976 |
| JP | 58-100206 U | 7/1983 |
| JP | 63-60006 U | 4/1988 |
| JP | 03-067031 A | 3/1991 |
| JP | 08-028239 A | 1/1996 |
| JP | 10-266973 A | 10/1998 |
| JP | 10-280933 A | 10/1998 |
| JP | 11-013429 A | 1/1999 |
| JP | 2000-054817 A | 2/2000 |
| JP | 2000-064817 A | 2/2000 |
| JP | 2000-205301 A | 7/2000 |
| JP | 2000-257453 A | 9/2000 |
| JP | 2001-317320 A | 11/2001 |
| JP | 2003-184528 A | 7/2003 |
| JP | 2004-108257 A | 4/2004 |
| JP | 2004-218523 A | 8/2004 |
| JP | 2004-324819 A | 11/2004 |
| JP | 2005-048665 A | 2/2005 |
| JP | 2005-054698 A | 3/2005 |
| JP | 2005-082016 A | 3/2005 |
| JP | 2005-529275 A | 9/2005 |
| JP | 2006-105038 A | 4/2006 |
| JP | 2006-200499 A | 8/2006 |
| JP | 2007-182833 A | 7/2007 |
| WO | 03/104075 A1 | 12/2003 |

* cited by examiner

POWER UNIT FOR SMALL-SIZED VEHICLE

TECHNICAL FIELD

The present invention relates to a power unit for a small-sized vehicle that includes a valve operating system equipped with a hydraulic valve operation mode change mechanism capable of changing the operational mode of an engine valve, and a clutch device disposed between a crankshaft and a shift mechanism so as to switch hydraulically between connection and disconnection of power transmission.

BACKGROUND ART

An arrangement in which a hydraulic device that generates hydraulic pressure for carrying out shift control of a continuously variable transmission is independent from a hydraulic device that generates hydraulic pressure for carrying out control of switching of a valve operation mode change mechanism in a valve operating system is already known from Patent Document 1.
Patent Document 1: Japanese Patent Application Laid-open No. 2000-257453

DISCLOSURE OF INVENTION

Problems to be Solved by the Invention

With regard to a small-sized vehicle such as a motorcycle, it is desirable that a hydraulic system associated with a plurality of hydraulic pressure control devices is made compact by suppressing any increase in the bulk of a power unit, but in the arrangement disclosed by Patent Document 1, since the hydraulic devices are independent from each other, the bulk of the power unit increases, and the hydraulic system has a large size.

The present invention has been accomplished in light of such circumstances, and it is an object thereof to provide a power unit suitable for a small-sized vehicle by making a hydraulic system compact while avoiding any increase in the overall bulk of the power unit.

Means for Solving the Problems

In order to attain the above object, according to a first aspect of the present invention, there is provided a power unit for a small-sized vehicle comprising a valve operating system equipped with a hydraulic valve operation mode change mechanism capable of changing the operational mode of an engine valve, and a clutch device disposed between a crankshaft and a shift mechanism so as to switch hydraulically between connection and disconnection of power transmission, characterized in that a discharge outlet of one oil pump driven by power transmission from the crankshaft is connected in common to the valve operation mode change mechanism and the clutch device.

According to a second aspect of the present invention, in addition to the arrangement of the second aspect, among two branched oil passages branching from the discharge outlet of the oil pump and connected to the valve operation mode change mechanism and the clutch device respectively, a pressure-reducing valve is disposed at a point partway along the branched oil passage connected to the valve operation mode change mechanism.

According to a third aspect of the present invention, in addition to the arrangement of the second aspect, an oil filter is disposed between the discharge outlet of the oil pump and the pressure-reducing valve, and the pressure-reducing valve is disposed in proximity to the oil filter.

According to a fourth aspect of the present invention, in addition to the arrangement of the third aspect, a filter case of the oil filter is formed into a substantially cylindrical shape, and at least part of the pressure-reducing valve is disposed so as to overlap the oil filter when viewed from the axial direction of the filter case mounted on the engine main body so as to project outward from the engine main body.

According to a fifth aspect of the present invention, in addition to the arrangement of the third aspect, the oil filter and the pressure-reducing valve are mounted on one cover member mounted on the engine main body.

It should be noted here that an intake valve 44 and an exhaust valve 45 of an embodiment correspond to the engine valve of the present invention, a rear bank side valve operating system 48R of the embodiment corresponds to the valve operating system of the present invention, a clutch cover 92 of the embodiment corresponds to the cover member of the present invention, a gear shift mechanism 103 of the embodiment corresponds to the shift mechanism of the present invention, and a first oil pump 209 of the embodiment corresponds to the oil pump of the present invention.

Effects of the Invention

In accordance with the first aspect of the present invention, since the discharge outlet of one oil pump is connected in common to the clutch device and the valve operation mode change mechanism of the valve operating system, it is possible to suppress any increase in the bulk of the power unit and make the hydraulic system associated with the valve operation mode change mechanism and the clutch device compact, thus providing a power unit suitable for a small-sized vehicle.

Furthermore, in accordance with the second aspect of the present invention, since the discharge hydraulic pressure from the oil pump is reduced and supplied to the valve operation mode change mechanism that can carry out a switching operation at a lower hydraulic pressure than that for the clutch device, a hydraulic pressure that is suitable for each of the valve operation mode change mechanism and the clutch device can be applied.

In accordance with the third aspect of the present invention, since the pressure-reducing valve is disposed in proximity to the oil filter, it is possible to arrange the pressure-reducing valve and the oil filter compactly while efficiently using necessary hydraulic pressure.

In accordance with the fourth aspect of the present invention, since at least part of the pressure-reducing valve and the oil filter overlap when viewed from a direction along the axis of the filter case, the pressure-reducing valve and the oil filter can be disposed in closer proximity to each other, thus yet further contributing to making the power unit compact.

In accordance with the fifth aspect of the present invention, since the pressure-reducing valve and the oil filter are mounted on one cover member, the ease of assembly can be enhanced. Furthermore, it becomes easy to separately form, using the same engine main body, a power unit having a pressure-reducing valve and an oil filter and a power unit not having a pressure-reducing valve and an oil filter.

EXPLANATION OF REFERENCE NUMERALS AND SYMBOLS

Figure 1:
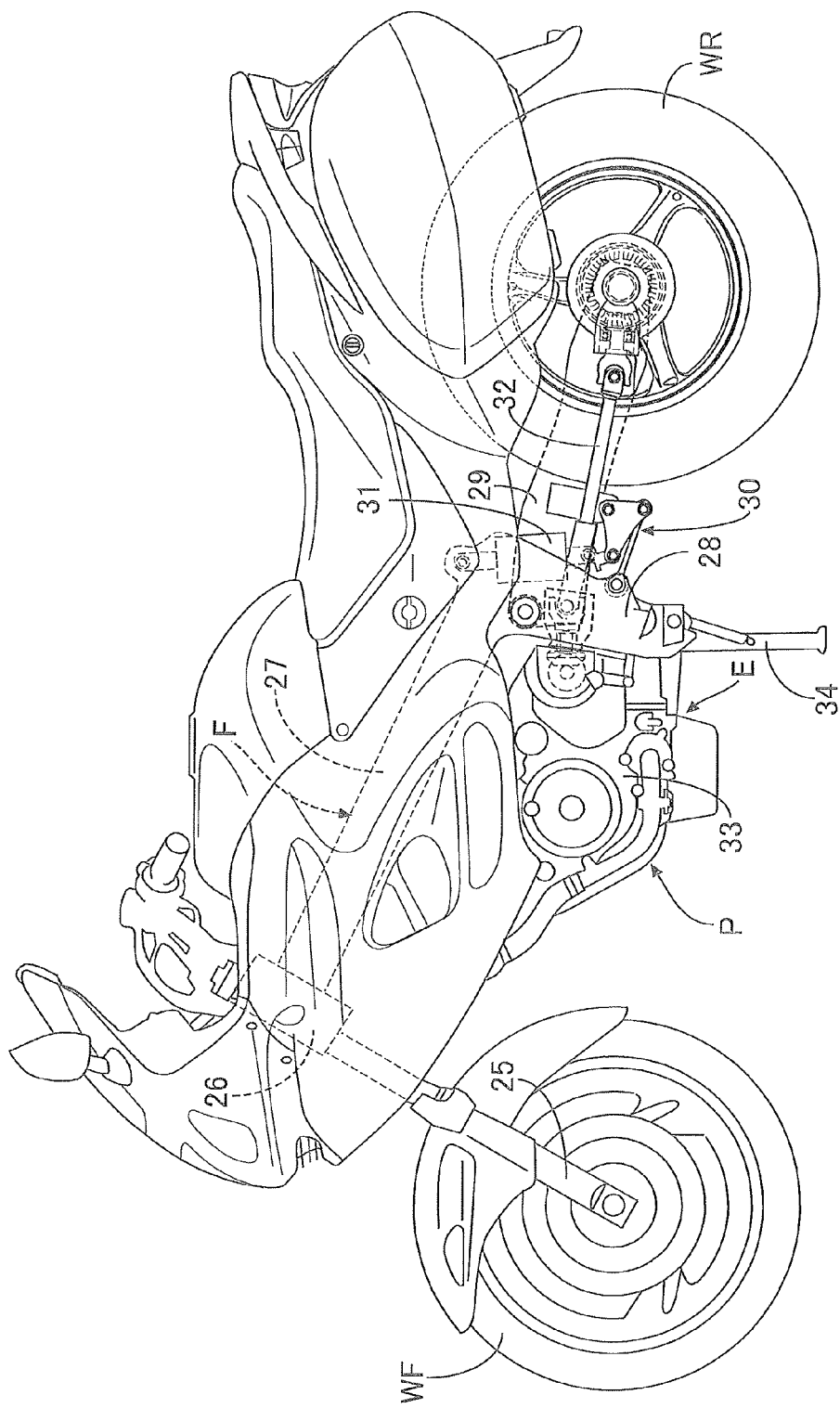
FIG. 1 is a left side view of a motorcycle. (first embodiment)

33 Engine main body
36 Crankshaft
44 Intake valve, which is an engine valve
45 Exhaust valve, which is an engine valve
48R Rear bank side valve operating system
63 Intake side valve operation mode change mechanism
64 Exhaust side valve operation mode change mechanism
92 Clutch cover, which is a cover member
102 Clutch device
103 Gear shift mechanism, which is a shift mechanism
209 Oil pump
216 Oil filter
218, 219 Branched oil passage
222 Pressure-reducing valve
239 Filter case
P Power unit

BEST MODE FOR CARRYING OUT THE INVENTION

One embodiment of the present invention is explained below by reference to FIG. 1 to FIG. 15.

Embodiment 1

First, in FIG. 1, a vehicle body frame F of a motorcycle, which is an astride-riding vehicle, has a head pipe 26 used for steering a front fork 25 axially supporting a front wheel WF, a pair of left and right main frames 27 and 27 extending downward to the rear from the head pipe 26, and a pair of left and right pivot plates 28 and 28 connected to rear parts of the two main frames 27 and 27 and extending downward, a rear wheel WR being axially supported on a rear part of a swing arm 29, the front end of which is swingably supported on the pivot plates 28 and 28. Moreover, a link 30 is provided between a lower part of the pivot plate 28 and a front part of the swing arm 29, and a cushion unit 31 is provided between an upper part of the pivot plate 28 and the link 30.

A power unit P is suspended on the main frames 27 and 27 and the pivot plates 28 and 28, and rotational power outputted from the power unit P is transmitted to the rear wheel WR via a drive shaft 32 extending in the fore-and-aft direction.

A side stand 34 is mounted on the vehicle body frame F or an engine main body 33 of an engine E of the power unit P, and in this embodiment the side stand 34 is mounted on a lower part of the pivot plate 28 on the left-hand side of the vehicle body frame F. When the vehicle is parked standing on the side stand 34, the motorcycle tilts leftward.

Figure 2:
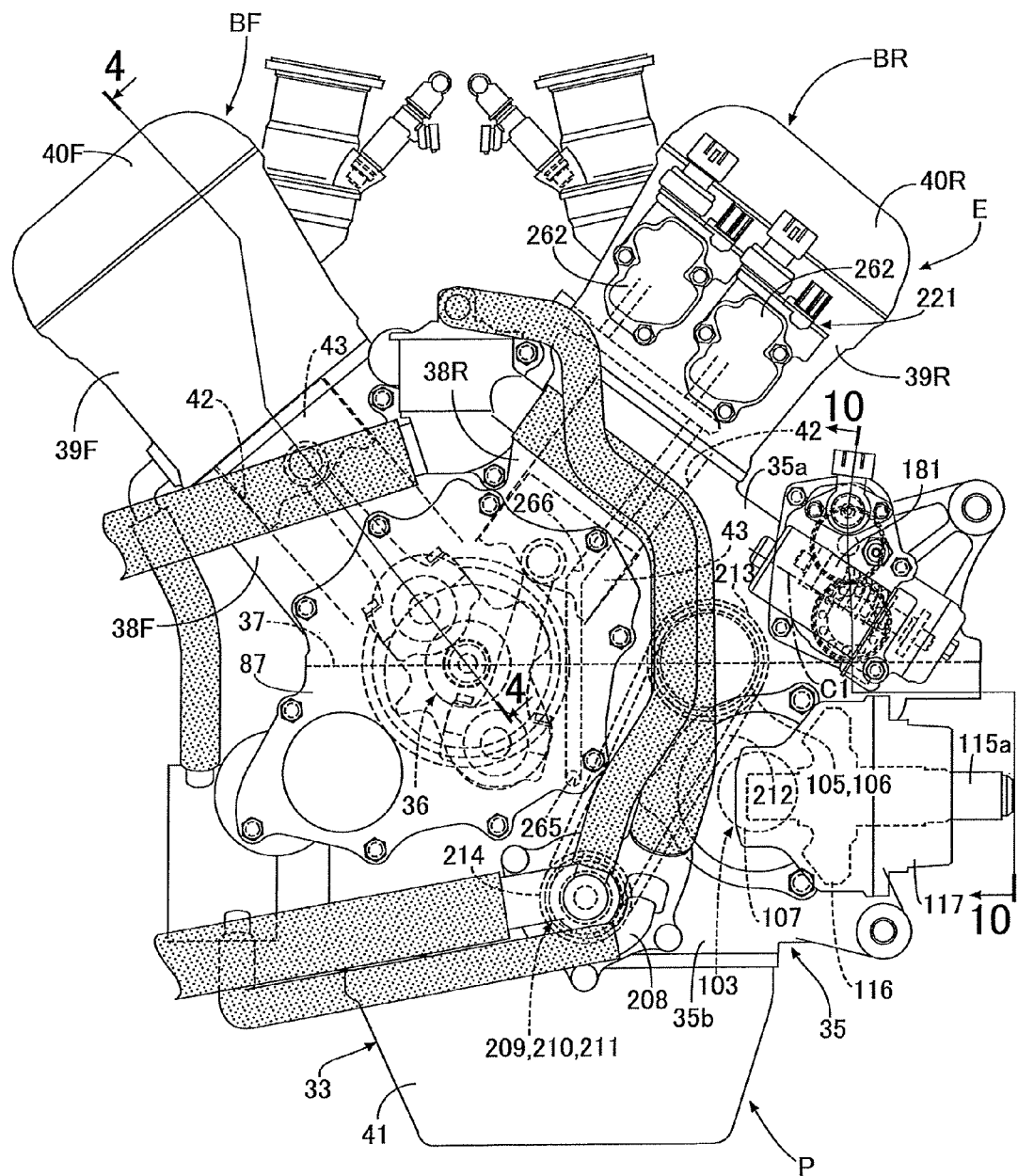
FIG. 2 is a left side view of a power unit. (first embodiment)
Figure 3:
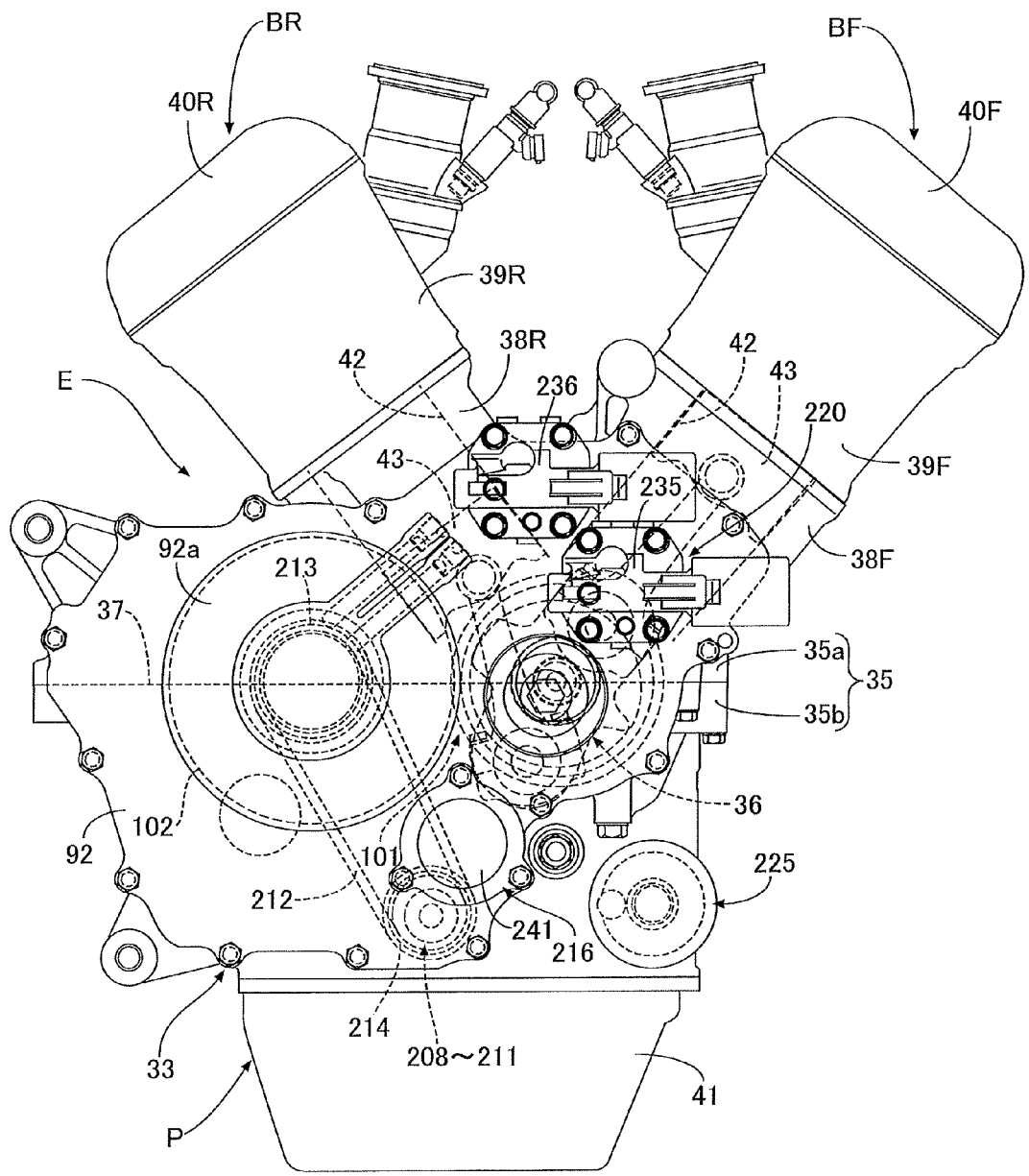
FIG. 3 is a right side view of the power unit. (first embodiment)

In FIG. 2 and FIG. 3, the engine main body 33 of the engine E is of a water-cooled V-type having, in a state in which it is installed on the motorcycle, a front bank BF positioned forward and a rear bank BR positioned to the rear of the front bank BF, and a crankshaft 36 along the left-and-right direction of the motorcycle is rotatably supported on a crankcase 35 used in common for the two banks BF and BR.

The crankcase 35 is formed by joining an upper case half 35a and a lower case half 35b, front and rear cylinder blocks BF and BR are formed into a V-shape integrally with the upper case half 35a, and the axis of the crankshaft 36 is disposed on joining faces 37 of the upper case half 35a and the lower case half 35b.

The front bank BF is formed from a front cylinder block 38F, a front cylinder head 39F joined to the front cylinder block 38F, and a front head cover 40F joined to the front cylinder head 39F, and the rear bank BR is formed from a rear cylinder block 38R, a rear cylinder head 39R joined to the rear cylinder block 38R, and a rear head cover 40R joined to the rear cylinder head 39R, an oil pan 41 being joined to a lower part of the crankcase 35.

Formed in the front cylinder block 39F are two cylinder bores 42 and 42 lined up in the axial direction of the crankshaft 36, the front cylinder block 39F being joined to the crankcase 35 so that the axes of the cylinder bores 42 and 42 tilt upward toward the front in a state in which the engine main body 33 is suspended on the vehicle body frame F. Moreover, formed in the rear cylinder block 39R are two cylinder bores 42 and 42 lined up in the axial direction of the crankshaft 36, the rear cylinder block 39R being joined to the crankcase 35 so that the axes of the cylinder bores 42 and 42 tilt upward toward the rear in a state in which the engine main body 33 is suspended on the vehicle body frame F. Pistons 43 slidably fitted into the two cylinder bores 42 and 42 of the front bank BF and pistons 43 slidably fitted into the two cylinder bores 42 and 42 of the rear bank BR are connected in common to the crankshaft 36.

Figure 4:
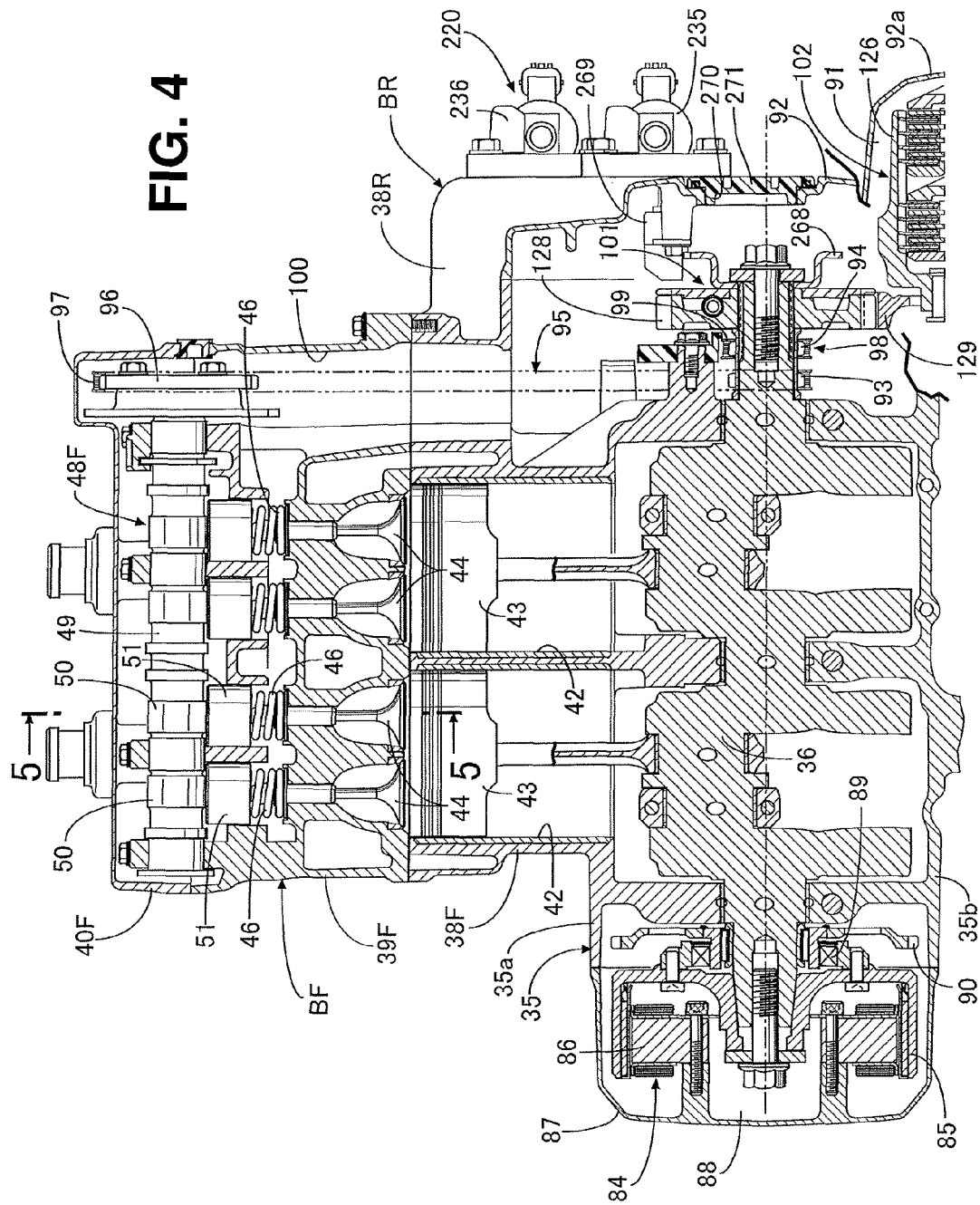
FIG. 4 is a sectional view along line 4-4 in FIG. 2. (first embodiment)
Figure 5:
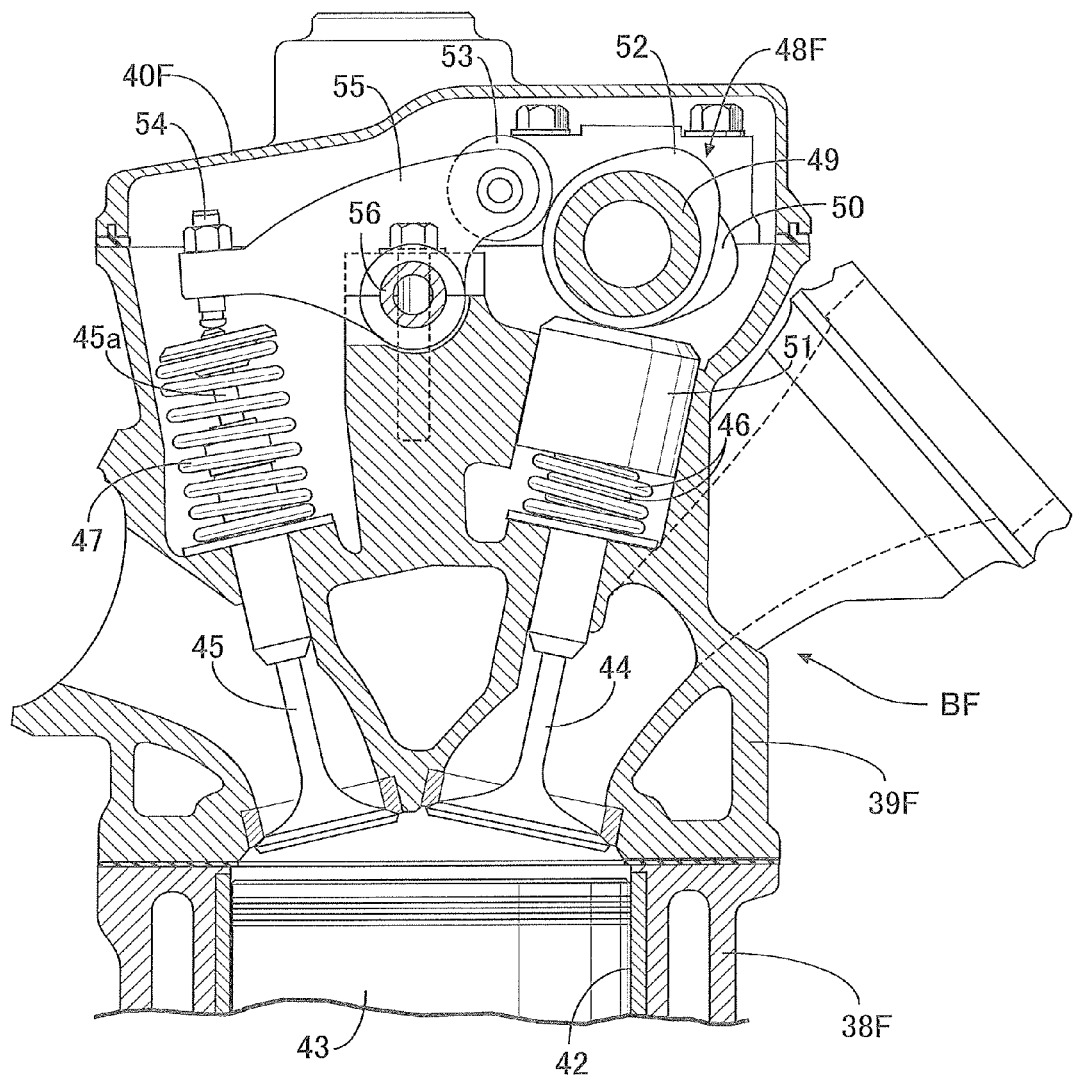
FIG. 5 is a sectional view along line 5-5 in FIG. 4. (first embodiment)

In FIG. 4 and FIG. 5, in the front cylinder head 39F, a pair of intake valves 44 and 44 for each of the cylinder bores 42 and 42 are openably and closably disposed while being urged in a valve-closing direction by a pair of valve springs 46 and 46, a pair of exhaust valves 45 and 45 are openably and closably disposed while being urged in a valve-closing direction by valve springs 47 and 47, and these intake valves 44 and exhaust valves 45 are made to open and close by a front bank side valve operating system 48F.

The front bank side valve operating system 48F includes a cam shaft 49 rotatably supported on the front cylinder head 39F so as to have an axis parallel to the crankshaft 36 and disposed above the intake valves 44, intake side valve lifters 51 slidably fitted into the front cylinder head 39F and disposed between the intake valves 44 and a plurality (four in this embodiment) of intake side cams 50 provided on the cam shaft 49, and rocker arms 55 having at one end rollers 53 in rolling contact with a plurality (four in this embodiment) of exhaust side cams 52 provided on the cam shaft 49 and having at the other end tappet screws 54 screwed thereinto so that the back and forth position is adjustable, the tappet screws 54 abutting against upper ends of stems 45a of the exhaust valves 45, and the rocker arms 55 being swingably supported by a rocker shaft 56 that has an axis parallel to the cam shaft 49 and is fixedly disposed on the front cylinder head 39F.

Figure 6:
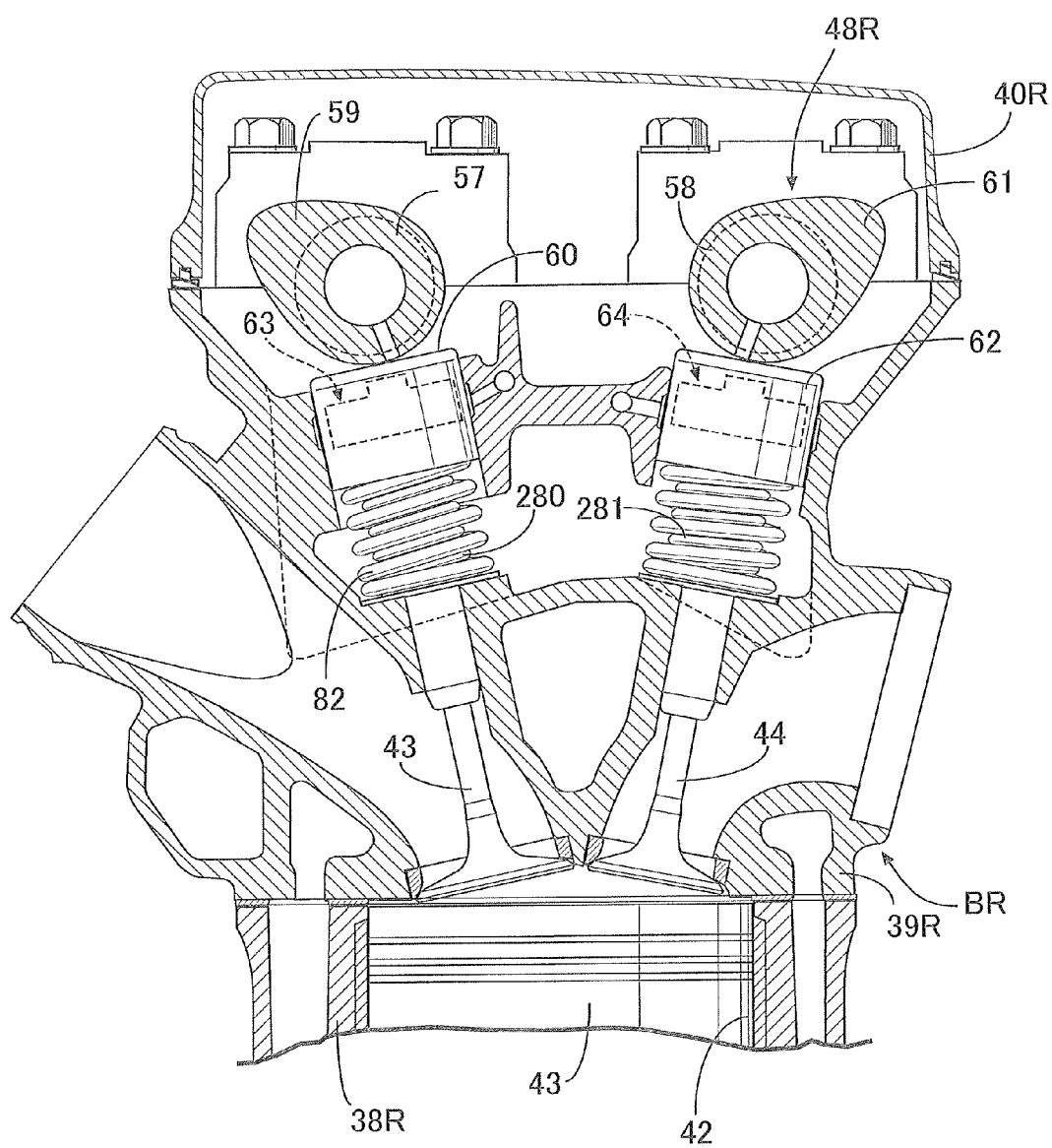
FIG. 6 is a sectional view, corresponding to FIG. 5, of a rear bank side. (first embodiment)

In FIG. 6, in the rear cylinder head 39R, a pair of intake valves 43 and 43 and a pair of exhaust valves 44 and 44 for each of the cylinder bores 42 and 42 are openably and closably disposed while being urged in a valve-closing direction by means of valve springs 280 and 281, and these intake valves 43 and exhaust valves 44 and 44 are made to open and close by a rear bank side valve operating system 48R.

The rear bank side valve operating system 48R includes an intake side cam shaft 57 rotatably supported on the rear cylinder head 39R so as to have an axis parallel to the crankshaft 36 and disposed above the intake valves 43, an exhaust side cam shaft 58 rotatably supported on the rear cylinder head 39R so as to have an axis parallel to the crankshaft 36 and disposed above the exhaust valves 44, intake side valve lifters 60 slidably fitted into the rear cylinder head 39R and disposed between the intake valves 43 and a plurality (four in this embodiment) of intake side cams 59 provided on the intake side cam shaft 57, and exhaust side valve lifters 62 slidably fitted into the rear cylinder head 39R and disposed between the exhaust valves 44 and a plurality (four in this embodiment) of exhaust side cams 61 provided on the exhaust side cam shaft 58.

Moreover, the rear bank side valve operating system 48R is provided with an intake side valve operation mode change mechanism 63 that can switch the mode of operation of the intake valves 43 of the two cylinders of the rear bank BR between an opening and closing state and a valve-closed cut-off state, and an exhaust side valve operation mode change mechanism 64 that can switch the operational mode of the exhaust valves 44 and 44 of the two cylinders between an opening and closing state and a valve-closed cut-off state.

Figure 7:
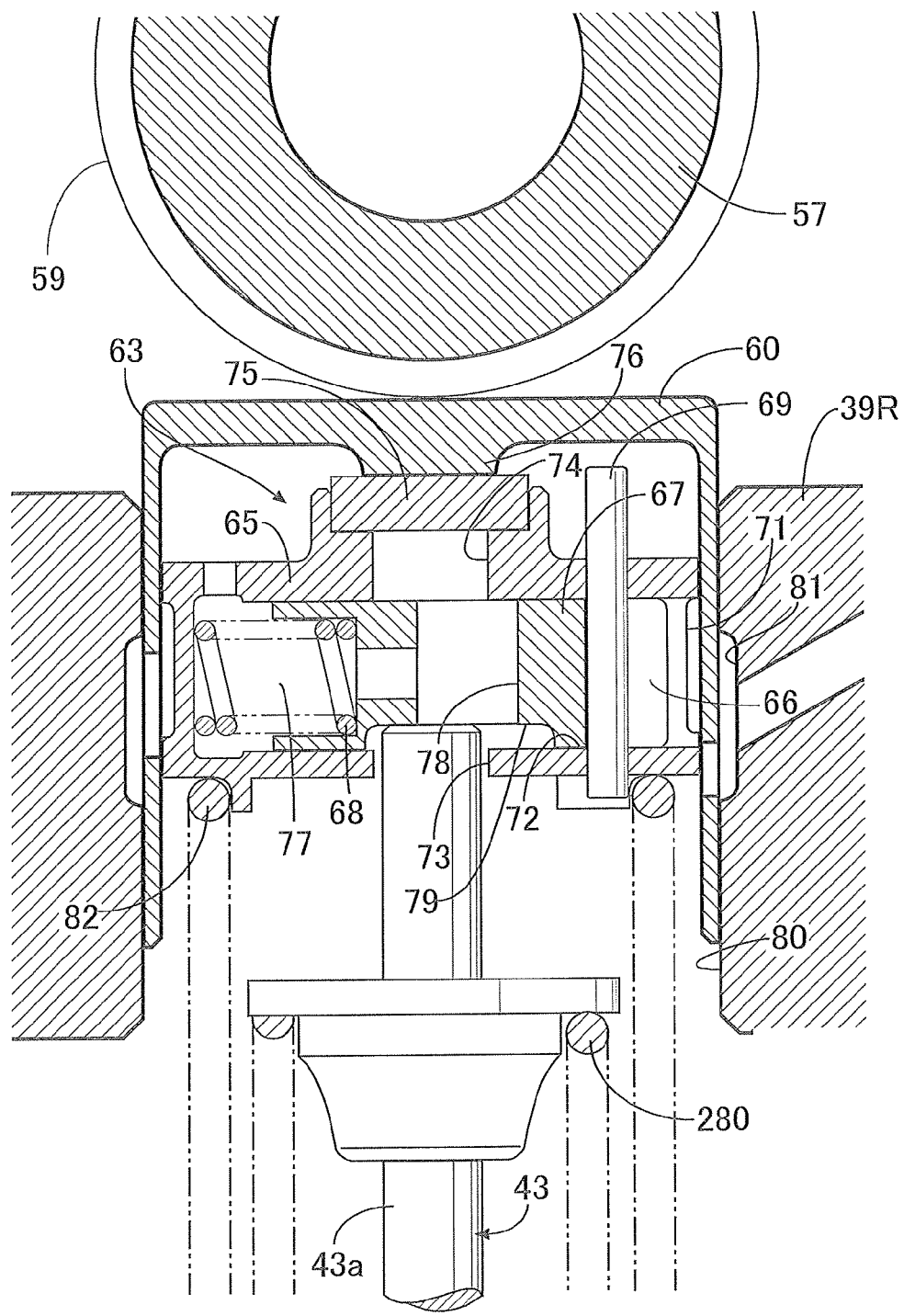
FIG. 7 is an enlarged sectional view of an essential part of FIG. 6. (first embodiment)

In FIG. 7, the intake side valve operation mode change mechanism 63 is provided in association with the intake side valve lifters 60, and includes a pin holder 65 slidably fitted into the intake side valve lifter 60, a slide pin 67 that is slidably fitted into the pin holder 65 and that forms a hydraulic chamber 66 between itself and an inner face of the intake side valve lifter 60, a return spring 68 that is provided between the slide pin 67 and the pin holder 65 and that exhibits a spring force urging the slide pin 67 in a direction that reduces the volume of the hydraulic chamber 66, and a stopper pin 69 that is provided between the pin holder 65 and the slide pin 67 and that prevents rotation of the slide pin 67 on its axis.

Provided on the outer periphery of the pin holder 65 is an annular groove 71, and provided in the pin holder 65 is a bottomed slide hole 72 having one end opening in the annular groove 71 and the other end closed while having an axis perpendicular to the axis of the intake side valve lifter 60. Coaxially provided in the pin holder 65 are a through hole 73 and an extension hole 74 so as to house an extremity part of a stem 43a of the intake valve 43, the extremity part of the stem 43a of the intake valve 43, which is urged in the valve-closing direction by means of the valve spring 280, being passed through the through hole 73, and the slide hole 72 being interposed between the extension hole 74 and the through hole 73. A disk-shaped shim 75 for blocking an end part of the extension hole 74 on the intake side valve lifter 60 closed end side is fitted into the pin holder 65, and a projection 76 abutting against the shim 75 is integrally provided with a central part on an inner face of the closed end of the intake side valve lifter 60.

The slide pin 67 is slidably fitted into the slide hole 72 of the pin holder 65. The hydraulic chamber 66, which communicates with the annular groove 71, is formed between one end of the slide pin 67 and the inner face of the intake side valve lifter 60, and the return spring 68 is housed within a spring chamber 77 formed between the other end of the slide pin 67 and the closed end of the slide hole 72.

A housing hole 78 is provided in an axially middle part of the slide pin 67 so as to house the extremity part of the stem 43a, the housing hole 78 being capable of coaxially communicating with the through hole 73 and the extension hole 74, and an end part, on the through hole 73 side, of the housing hole 78 opening on a flat abutment face 79 formed on an outside face of a lower part of the slide pin 67 so as to face the through hole 73. The abutment face 79 is formed relatively long along the axial direction of the slide pin 67, and the housing hole 78 opens in a portion of the abutment face 79 on the hydraulic chamber 66 side.

The slide pin 67 slides in the axial direction so that hydraulic pressure force acting on one end side of the slide pin 67 due to the hydraulic pressure of the hydraulic chamber 66 balances the spring force of the return spring 68 acting on the other end side of the slide pin 67; at a non-operational time when the hydraulic pressure of the hydraulic chamber 66 is low, the slide pin 67 moves rightward in FIG. 7 so that the housing hole 78 is displaced from the axis of the through hole 73 and the extension hole 74 and the extremity of the stem 43a abuts against the abutment face 79, and in an operational state in which the hydraulic pressure of the hydraulic chamber 66 becomes high the slide pin 67 moves leftward in FIG. 7 so as to house the extremity part of the stem 43a, which has passed through the through hole 73, within the housing hole 78 and the extension hole 74.

When the slide pin 67 moves to a position in which the housing hole 78 coaxially communicates with the through hole 73 and the extension hole 74, the pin holder 65 and the slide pin 67 move to the intake valve 43 side together with the intake side valve lifter 60 in response to the intake side valve lifter 60 being made to slide by the pressing force from the intake side cam 59, the extremity part of the stem 43a is merely housed within the housing hole 78 and the extension hole 74, no pressing force in the valve-opening direction is applied to the intake valve 43 from the intake side valve lifter 60 and the pin holder 65, and the intake valve 43 remains cut off. When the slide pin 67 moves to a position in which the extremity part of the stem 43a abuts against the abutment face 79, since a pressing force in the valve-opening direction is applied to the intake valve 43 accompanying movement of the pin holder 65 and the slide pin 67 to the intake valve 43 side in response to sliding of the intake side valve lifter 60 by the pressing force from the intake side valve operating cam 59, the intake valve 43 is operated so as to open and close in response to rotation of the intake side cam 59.

In order to slidably support the intake side valve lifters 60 the rear cylinder head 39R is provided with support holes 80 into which the intake side valve lifters 60 are fitted, and annular recesses 81 are provided on an inner face of the support holes 80 so as to surround the intake side valve lifters 60, the annular recesses 81 communicating with the annular groove 71 of the pin holder 65 regardless of sliding of the intake side valve lifters 60 within the support holes 80. Springs 82 are provided between the intake side valve lifters 60 and the rear cylinder head 39R, the springs 82 urging the intake side valve lifters 60 in a direction in which they abut against the intake side cams 59.

The exhaust side valve operation mode change mechanism 64 is arranged in the same manner as for the intake side valve operation mode change mechanism 63 and is provided in association with the exhaust side valve lifters 62; it can switch between a state in which the exhaust valve 44 is closed and cut off when high hydraulic pressure is applied and a state in which the exhaust valve 44 is operated so as to open and close when the applied hydraulic pressure decreases.

That is, by controlling the operation of the intake side valve operation mode change mechanism 63 and the exhaust side valve operation mode change mechanism 64, the rear bank side valve operating system 48R can switch between a state in which the intake valves 43 and the exhaust valves 44 of two cylinders of the rear bank BR are operated so as to open and close and a state of cylinder cut off in which the intake valves 43 and the exhaust valves 44 of two cylinders of the rear bank BR are closed and cut off.

Referring again to FIG. 4, a generator 84 is connected to a left-hand end part of the crankshaft 36 in a state in which the engine main body 33 is installed on the vehicle body frame F; this generator 84 is formed from a rotor 85 fixed to the crankshaft 36 and a stator 86 fixedly disposed within the rotor 85 and is housed within a generator housing chamber 88 formed from the crankcase 35 and a generator cover 87 joined to a left-hand side face of the crankcase 35, the stator 86 being fixed to the generator cover 87.

Moreover, a gear 90 is connected to the rotor 86 via a one-way clutch 89 that enables power transmission toward the rotor 86 side, and power from a starting motor, which is not illustrated, is transmitted to the gear 90.

On the other hand, a clutch cover 92 forming a clutch chamber 91 between itself and the crankcase 35 is joined to a right-hand side face of the crankcase 35 in a state in which the engine main body 33 is installed on the vehicle body frame F, and drive sprockets 93 and 94 are fixedly provided on the crankshaft 36 within the clutch chamber 91. One of the drive sprockets 93 forms part of a front bank side timing transmission mechanism 95 for transmitting rotational power of the crankshaft 36 to the cam shaft 49 of the front bank side valve operating system 48F at a reduction ratio of 1/2, the front bank side timing transmission mechanism 95 being formed by winding an endless cam chain 97 around the drive sprocket 93 and a driven sprocket 96 provided on the cam shaft 49. The other drive sprocket 94 forms part of a rear bank side timing transmission mechanism 98 for transmitting rotational power of the crankshaft 36 to the intake side and exhaust side cam shafts 57 and 58 of the rear bank side valve operating system 48R at a reduction ratio of 1/2, this rear bank side timing transmission mechanism 98 being formed by winding an endless cam chain 99 around the drive sprocket 94 and driven sprockets (not illustrated) provided on the intake side and exhaust side cam shafts 57 and 58.

Formed in the front cylinder block 38F and the front cylinder head 39F is a cam chain chamber 100 within which the cam chain 97 runs, and formed in the rear cylinder block 38R and the rear cylinder head 39R is a cam chain chamber (not illustrated) within which the cam chain 99 runs.

A power transmission path between the crankshaft 36 and the rear wheel WR includes, in sequence from the crankshaft 36 side, a primary reduction gear 101, a clutch device 102, a gear shift mechanism 103 (see FIG. 8), and the drive shaft 32, the primary reduction gear 101 and the clutch device 102 being housed in the clutch chamber 91, and the gear shift mechanism 103 being housed in the crankcase 35.

Figure 8:
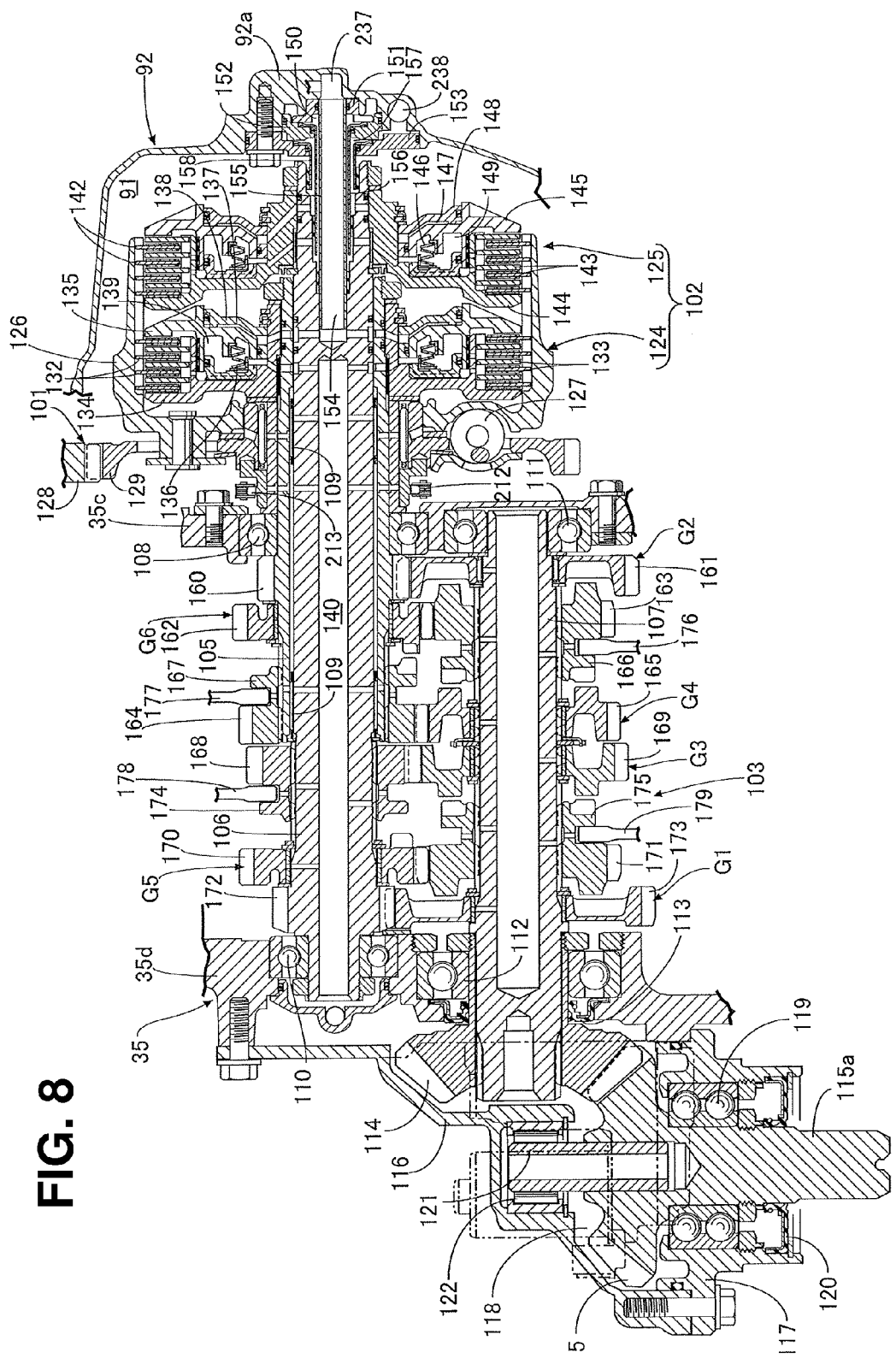
FIG. 8 is a vertical sectional view a gear shift mechanism and a clutch device. (first embodiment)

In FIG. 8, the gear shift mechanism 103 is housed within the crankcase 35 and includes a plurality of shift stage gear trains that can be selectively established, for example, first to sixth speed gear trains G1, G2, G3, G4, G5, and G6, the second, fourth, and sixth speed gear trains G2, G4, and G6 being provided between a first main shaft 105 and a countershaft 107, and the first, third, and fifth speed gear trains G1, G3, and G5 being provided between the countershaft 107 and a second main shaft 106 coaxially and relatively rotatably extending through the first main shaft 105.

The crankcase 35 includes a pair of side walls 35c and 35d facing each other across a gap in a direction along the axis of the crankshaft 36, and a middle part of the first main shaft 105, which is formed into a cylindrical shape with an axis parallel to the crankshaft 36, rotatably extends through the side wall 35c, a ball bearing 108 being disposed between the side wall 35c and the first main shaft 105. The second main shaft 106, whose axis is parallel to the crankshaft 36, relatively rotatably extends through the first main shaft 105 while keeping a constant axial position relative to the first main shaft 105, and a plurality of needle bearings 109 are disposed between the first main shaft 105 and the second main shaft 106. The other end part of the second main shaft 106 is rotatably supported on the side wall 35d of the crankcase 35 via a ball bearing 110.

One end part of the countershaft 107, whose axis is parallel to the crankshaft 36, is rotatably supported on the side wall 35c via a ball bearing 111, the other end part of the countershaft 107 rotatably extends through the side wall 35d with a ball bearing 112 and an annular seal member 113 interposed between itself and the side wall 35d, and a drive bevel gear 114 is fixed to a projecting end part of the countershaft 107 from the side wall 35d. A driven bevel gear 115 having a rotational axis extending in the fore-and-aft direction of the motorcycle meshes with the drive bevel gear 114.

The drive bevel gear 114 and the driven bevel gear 115 mesh with each other within a gear chamber 118 formed from a first gear cover 116 detachably joined to the side wall 35d of the crankcase 35 so as to cover part of the side wall 35d, a second gear cover 117 detachably joined to the first gear cover 116, and the side wall 35d, a coaxial shaft portion 115a of the driven bevel gear 115 rotatably extends through the second gear cover 117, and an annular seal member 120 and a ball bearing 119 are disposed between the shaft portion 115a and the second gear cover 117, the annular seal member 120 being positioned outside the ball bearing 119. Furthermore, one end part of a support shaft 121 is fitted into the driven bevel gear 115, and the other end part of the support shaft 121 is rotatably supported on the first gear cover 116 via a roller bearing 122. The shaft portion 115a is connected to the drive shaft 32.

Figure 9:
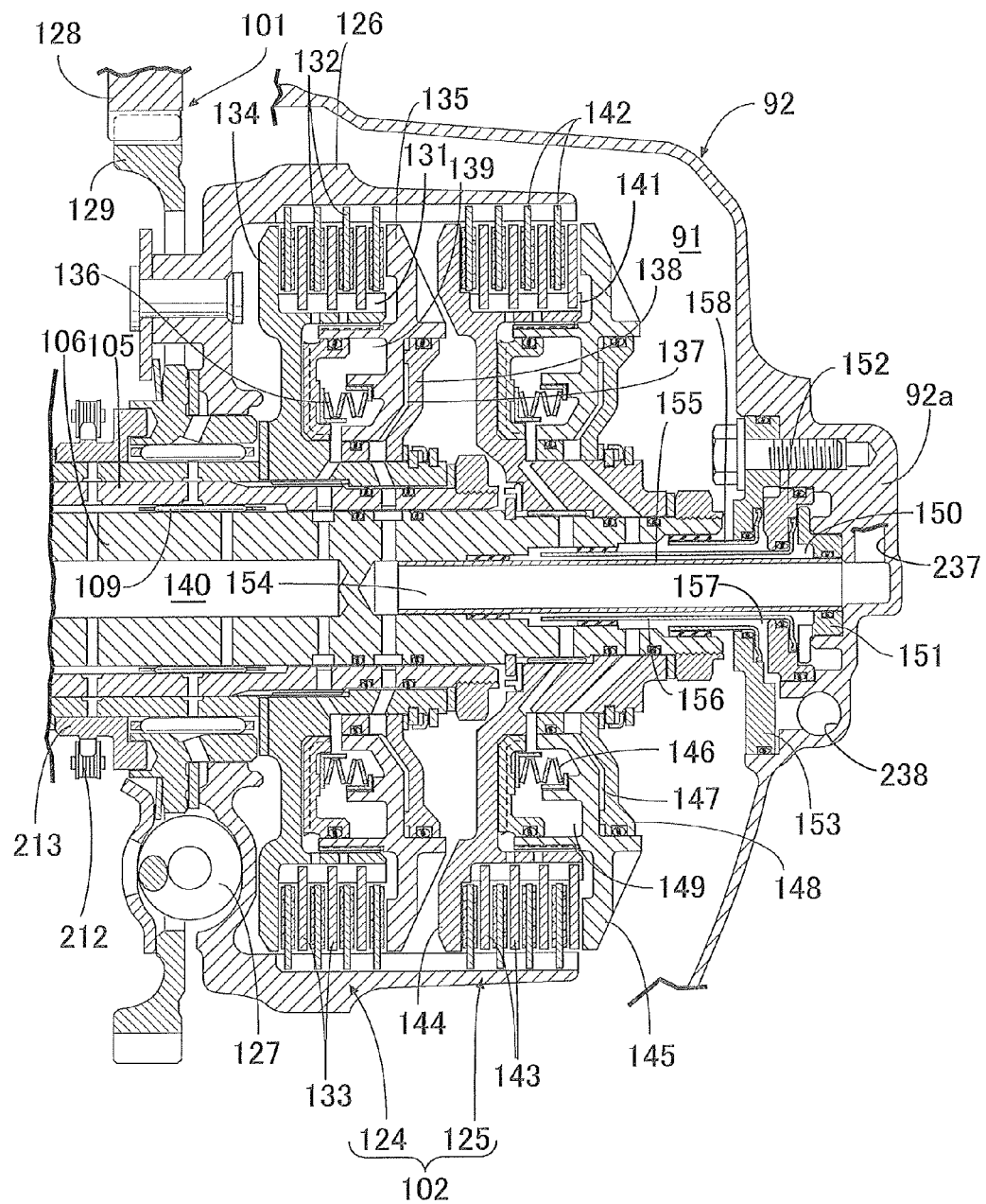
FIG. 9 is an enlarged view of an essential part of FIG. 8. (first embodiment)

Referred in addition to FIG. 9, the clutch device 102 is formed as a twin type with first and second clutches 124 and 125 being provided between the gear shift mechanism 103 and the crankshaft 36; the first clutch 124 is provided between the crankshaft 36 and one end part of the first main shaft 105, and the second clutch 125 is provided between the crankshaft 36 and one end part of the second main shaft 106. Power from the crankshaft 36 is inputted to a clutch outer 126, which is used in common for the first and second clutches 124 and 125, via the primary reduction gear 101 and a damper spring 127.

The primary reduction gear 101 is formed from a drive gear 128 provided on the crankshaft 36 outside the drive sprocket 94, and a driven gear 129 relatively rotatably supported on the first main shaft 105 and meshing with the drive gear 128, the driven gear 129 being connected to the clutch outer 126 via the damper spring 127.

Referring to FIG. 4, a pulser 268 is mounted at the shaft end of the crankshaft 36 outside the primary reduction gear 101, and a rotational speed detector 269 for detecting the rotational speed of the crankshaft 36 by detecting the pulser 268 is mounted on an inner face of the clutch cover 92. Furthermore, an inspection hole 270 for inspecting the pulser 268 is provided in the clutch cover 92; this inspection hole 270 is provided in the clutch cover 92 so as to be eccentric to the axis of the crankshaft 36 in order to minimize the diameter, and the inspection hole 270 is blocked by a detachable cover member 271.

The first clutch 124 includes the clutch outer 126, a first clutch inner 131 coaxially surrounded by the clutch outer 126 and relatively non-rotatably joined to the first main shaft 105, a plurality of first friction plates 132 relatively non-rotatably engaged with the clutch outer 126, a plurality of second friction plates 133 relatively non-rotatably engaged with the first clutch inner 131 and disposed alternately with the first friction plates 132, a first pressure-receiving plate 134 provided on the first clutch inner 131 so as to face the first and second friction plates 132 and 133, which are mutually overlappingly disposed, a first piston 135 with the first and second friction plates 132 and 133 interposed between itself and the first pressure-receiving plate 134, and a first spring 136 urging the first piston 135.

An end wall member 138 forming a first hydraulic chamber 137 between itself and the first piston 135 is fixedly disposed on the first clutch inner 131, a back face of the first piston 135 facing the first hydraulic chamber 137, and the first piston 135 operates so as to clamp under pressure the first and second friction plates 132 and 133 between itself and the first pressure-receiving plate 134 in response to an increase in the hydraulic pressure of the first hydraulic chamber 137, thereby putting the first clutch 124 in a connected state in which power transmitted from the crankshaft 36 to the clutch outer 126 is transmitted to the first main shaft 105. Furthermore, a canceller chamber 139 is formed between the first clutch inner 131 and the first piston 135, a front face of the first piston 135 facing the canceller chamber 139, and the first spring 136 is housed in the canceller chamber 139 so as to exhibit a spring force toward the side that reduces the volume of the first hydraulic chamber 137.

Moreover, the canceller chamber 139 communicates with a first oil passage 140 coaxially provided in the second main shaft 106 in order to supply oil to parts, that are to be lubricated, of the gear shift mechanism 103 and a part between the first and second main shafts 105 and 106. Therefore, even if centrifugal force accompanying rotation acts on oil in the first hydraulic chamber 137 in a reduced pressure state and a force pressing the first piston 135 is generated, since the same centrifugal force acts on oil in the canceller chamber 139 it is possible to avoid a state in which the first piston 135 undesirably moves to the side in which it clamps the first and second friction plates 132 and 133 between itself and the first pressure-receiving plate 134.

The second clutch 125 is disposed so as to be lined up with the first clutch 124 in a direction along the axis of the second main shaft 106 with the first clutch 124 interposed between itself and the primary reduction gear 10, and includes the clutch outer 126, a second clutch inner 141 coaxially surrounded by the clutch outer 126 and relatively non-rotatably joined to the second main shaft 106, a plurality of third friction plates 142 relatively non-rotatably engaged with the clutch outer 126, a plurality of fourth friction plates 143 relatively non-rotatably engaged with the second clutch inner 141 and disposed alternately with the third friction plates 142, a second pressure-receiving plate 144 provided on the second clutch inner 141 so as to face the third and fourth friction plates 142 and 143, which are mutually overlappingly disposed, a second piston 145 with the third and fourth friction plates 142 and 143 interposed between itself and the second pressure-receiving plate 144, and a second spring 146 urging the second piston 145.

An end wall member 148 forming a second hydraulic chamber 147 between itself and the second piston 145 is fixedly disposed on the second clutch inner 141, a back face of the second piston 145 facing the second hydraulic chamber 147, the second piston 145 moves so as to clamp under pressure the third and fourth friction plates 142 and 143 between itself and the second pressure-receiving plate 144 in response to an increase in the hydraulic pressure of the second hydraulic chamber 147, and the second clutch 125 is thereby put in a connected state in which power transmitted from the crankshaft 36 to the clutch outer 126 is transmitted to the second main shaft 106. Furthermore, a canceller chamber 149 is formed between the second clutch inner 141 and the second piston 145, a front face of the second piston 145 facing the canceller chamber 149, and the second spring 146 is housed in the canceller chamber 149 so as to exhibit a spring force toward the side that reduces the volume of the second hydraulic chamber 147.

Moreover, the canceller chamber 149 communicates with a second oil pathway 150, which is described later. Therefore, even if centrifugal force accompanying rotation acts on oil in the second hydraulic chamber 147 in a reduced pressure state and a force pressing the second piston 145 is generated, since the same centrifugal force acts on oil in the canceller chamber 149 it is possible to avoid a state in which the second piston 145 undesirably moves to the side in which it clamps the third and fourth friction plates 142 and 143 between itself and the second pressure-receiving plate 144.

First, second, and third dividing wall members 151, 152, and 153 are mounted on an inner face side of the clutch cover 92, which covers the first and second clutches 124 and 125 from the right-hand side when facing forward in the travel direction of the motorcycle. A first tubular member 155 is provided between the second main shaft 106 and the first dividing wall member 151, the first tubular member 155 forming a first oil passage 154 communicating with the first hydraulic chamber 137 of the first clutch 124, a second tubular member 156 is provided between the second main shaft 106 and the second dividing wall member 152, the second tubular member 156 coaxially surrounding the first tubular member 155 while forming between itself and the first tubular member 155 the annular second oil pathway 150 communicating with the canceller chamber 149 of the second clutch 125, and a third tubular member 158 is provided between the second main shaft 106 and the third dividing wall member 153, the third tubular member 158 coaxially surrounding the second tubular member 156 while forming between itself and the second tubular member 156 an annular second oil passage 157 communicating with the second hydraulic chamber 147.

Referring again to FIG. 8, the fourth speed gear train G4, the sixth speed gear train G6, and the second speed gear train G2 are provided between the first main shaft 105 and the countershaft 107 of the gear shift mechanism 103 so as to be lined up in sequence from the opposite side to the clutch device 102. The second speed gear train G2 is formed from a second speed drive gear 160 provided integrally with the first main shaft 105 and a second speed driven gear 161 relatively rotatably supported on the countershaft 107 and meshing with the second speed drive gear 160, the sixth speed gear train G6 is formed from a sixth speed drive gear 162 relatively rotatably supported on the first main shaft 105 and a sixth speed driven gear 163 relatively non-rotatably but axially movably supported on the countershaft 107 and meshing with the sixth speed drive gear 162, and the fourth speed gear train G4 is formed from a fourth speed drive gear 164 relatively non-rotatably but axially movably supported on the first main shaft 105 and a fourth speed driven gear 165 relatively rotatably supported on the countershaft 107 and meshing with the fourth speed drive gear 164.

A first shifter 166 is relatively non-rotatably but axially movably supported on the countershaft 107 between the second speed driven gear 161 and the fourth speed driven gear 165, the first shifter 166 being capable of switching between a state in which it engages with the second speed driven gear 161, a state in which it engages with the fourth speed driven gear 165, and a state in which it does not engage with either the second speed driven gear 161 or the fourth speed driven gear 165, the sixth speed driven gear 163 being integrally provided with the first shifter 166. The fourth speed drive gear 164 is integrally provided with a second shifter 167 relatively non-rotatably but axially movably supported on the first main shaft 105, and the second shifter 167 is capable of switching between engagement with and disengagement from the sixth speed drive gear 162.

The second speed gear train G2 is established by engaging the first shifter 166 with the second speed driven gear 161 in a state in which the second shifter 167 is not engaged with the sixth speed drive gear 162, the fourth speed gear train G4 is established by engaging the first shifter 166 with the fourth speed driven gear 165 in a state in which the second shifter 167 is not engaged with the sixth speed drive gear 162, and the sixth speed gear train G6 is established by engaging the second shifter 167 with the sixth speed drive gear 162 when the first shifter 166 is in a neutral state.

The first speed gear train G1, the fifth speed gear train G5, and the third speed gear train G3 are provided between the countershaft 107 and a portion of the second main shaft 106 projecting from the other end part of the first main shaft 105 so as to be lined up in sequence from the side opposite to the clutch device 102. The third speed gear train G3 is formed from a third speed drive gear 168 relatively non-rotatably but axially movably supported on the second main shaft 106 and a third speed driven gear 169 relatively rotatably supported on the countershaft 107 and meshing with the third speed drive gear 168, the fifth speed gear train G5 is formed from a fifth speed drive gear 170 relatively rotatably supported on the second main shaft 106 and a fifth speed driven gear 171 axially movably but relatively non-rotatably supported on the countershaft 107 and meshing with the fifth speed drive gear 170, and the first speed gear train G1 is formed from a first speed drive gear 172 integrally provided with the second main shaft 106 and a first speed driven gear 173 relatively rotatably supported on the countershaft 107 and meshing with the first speed drive gear 172.

The third speed drive gear 168 is integrally provided with a third shifter 174 relatively non-rotatably but axially movably supported on the second main shaft 106, the third shifter 174 being capable of switching between engagement with and disengagement from the fifth speed drive gear. A fourth shifter 175 is relatively non-rotatably but axially movably supported on the countershaft 107 between the third speed driven gear 169 and the first speed driven gear 173, the fourth shifter 175 being capable of switching between a state in which it engages with the third speed driven gear 169, a state in which it engages with the first speed driven gear 173, and a neutral state in which it does not engage with either the third speed driven gear 169 or the first speed driven gear 173, the fifth speed driven gear being integrally provided with the fourth shifter 175.

The first speed gear train G1 is established by engaging the fourth shifter 175 with the first speed driven gear in a state in which the third shifter 174 is not engaged with the fifth speed drive gear, the third speed gear train G3 is established by engaging the fourth shifter 175 with the third speed driven gear 169 in a state in which the third shifter 174 is not engaged with the fifth speed drive gear, and the fifth speed gear train G5 is established by engaging the third shifter 174 with the fifth speed drive gear in a state in which the fourth shifter 175 is in a neutral state.

The first to fourth shifters 166, 167, 174, and 175 are rotatably retained by first to fourth shift forks 176, 177, 178, and 179, and driving these shift forks 176 to 179 in the axial direction of the two main shafts 105 and 106 and the countershaft 107 makes the first to fourth shifters 166, 167, 174, and 175 move moved in the axial direction.

Figure 10:
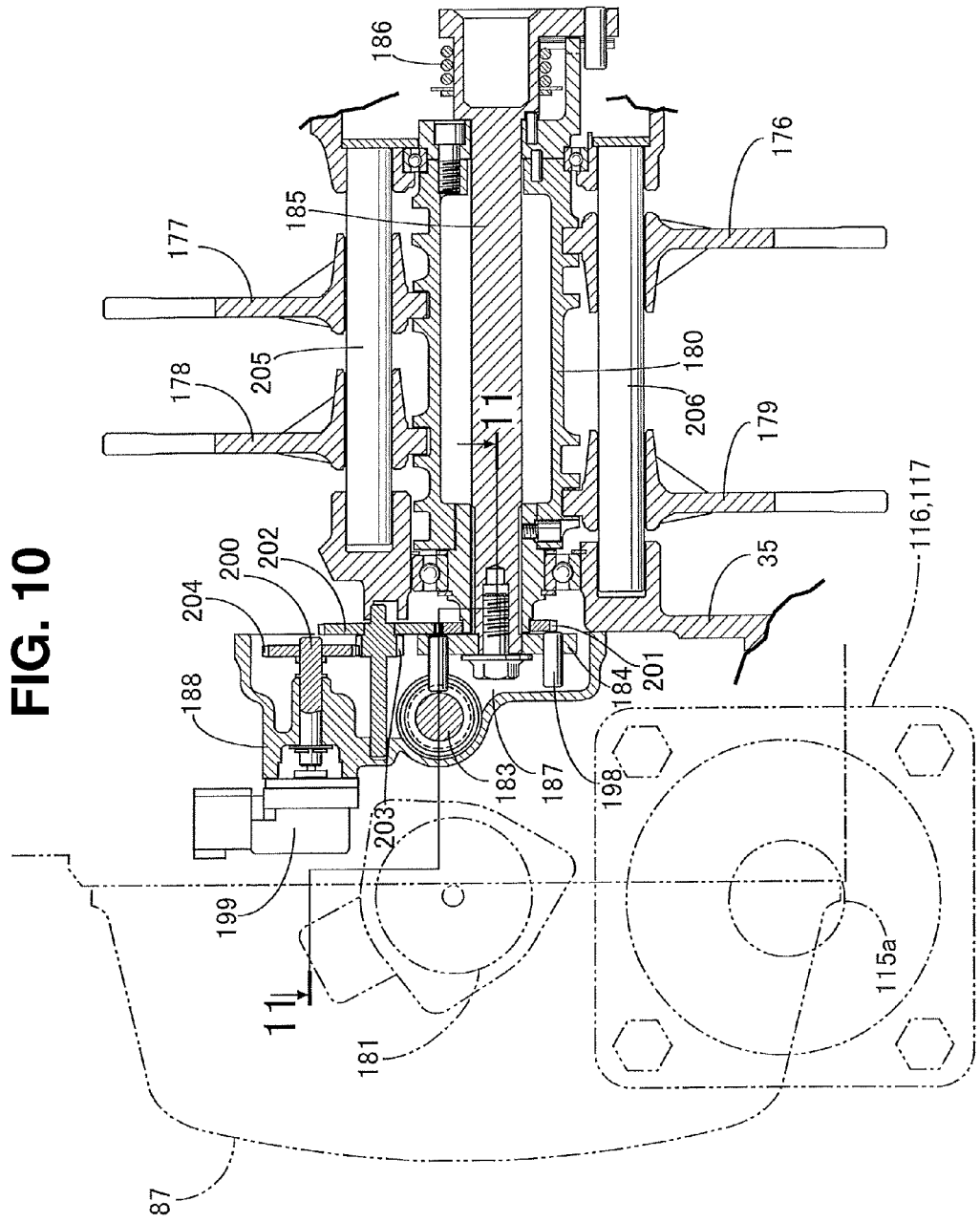
FIG. 10 is an enlarged sectional view along line 10-10 in FIG. 2. (first embodiment)

In FIG. 10, the first to fourth shift forks 176 to 179 are engaged with the outer periphery of a shift drum 180 that has an axis parallel to the axis of the crankshaft 36 and that is rotatably supported on the crankcase 35 and are slidably supported on shift fork shafts 205 and 206 that have an axis parallel to the shift drum 180 and that are supported on the crankcase 35, the shift forks 176 to 179 sliding on the shift fork shafts 205 and 206 in response to pivoting of the shift drum 180.

The shift drum 180 is pivoted by power exerted by a shift-drive electric motor 181; this shift-drive electric motor 181 is mounted on a side face of the crankcase 35, and in this embodiment it is mounted on either a left- or right-hand side face of the crankcase 35 in a state in which the engine main body 33 is installed on the vehicle body frame F, for example, on the left-hand side face. Moreover, the first and second gear covers 116 and 117 are detachably mounted on the left-hand side face of the crankcase 35 so as to cover the shaft end of the countershaft 107 of the gear shift mechanism 103, and the shift-drive electric motor 181 is disposed above the first and second gear covers 116 and 117 further inside than the outer ends of the first and second gear covers 116 and 117 along the axis of the countershaft 107. The generator cover 87 is mounted on the left-hand side face of the crankcase 35, and the shift-drive electric motor 181 is disposed to the rear of the generator cover 87 as shown in FIG. 2 and is disposed further inside than the outer end of the generator cover 87 along the axis of the shift drum 180, that is, the axis of the crankshaft 36, as shown in FIG. 10.

Moreover, as shown in FIG. 2, the shift-drive electric motor 181 is mounted on the left-hand side face of the crankcase 35 in a state in which an operation axis thereof, that is, a rotational axis C1, is disposed within a plane perpendicular to the axial direction of the gear shift mechanism 103 and is tilted in the vertical direction, in this embodiment a state in which it is tilted upward toward the front.

Figure 11:
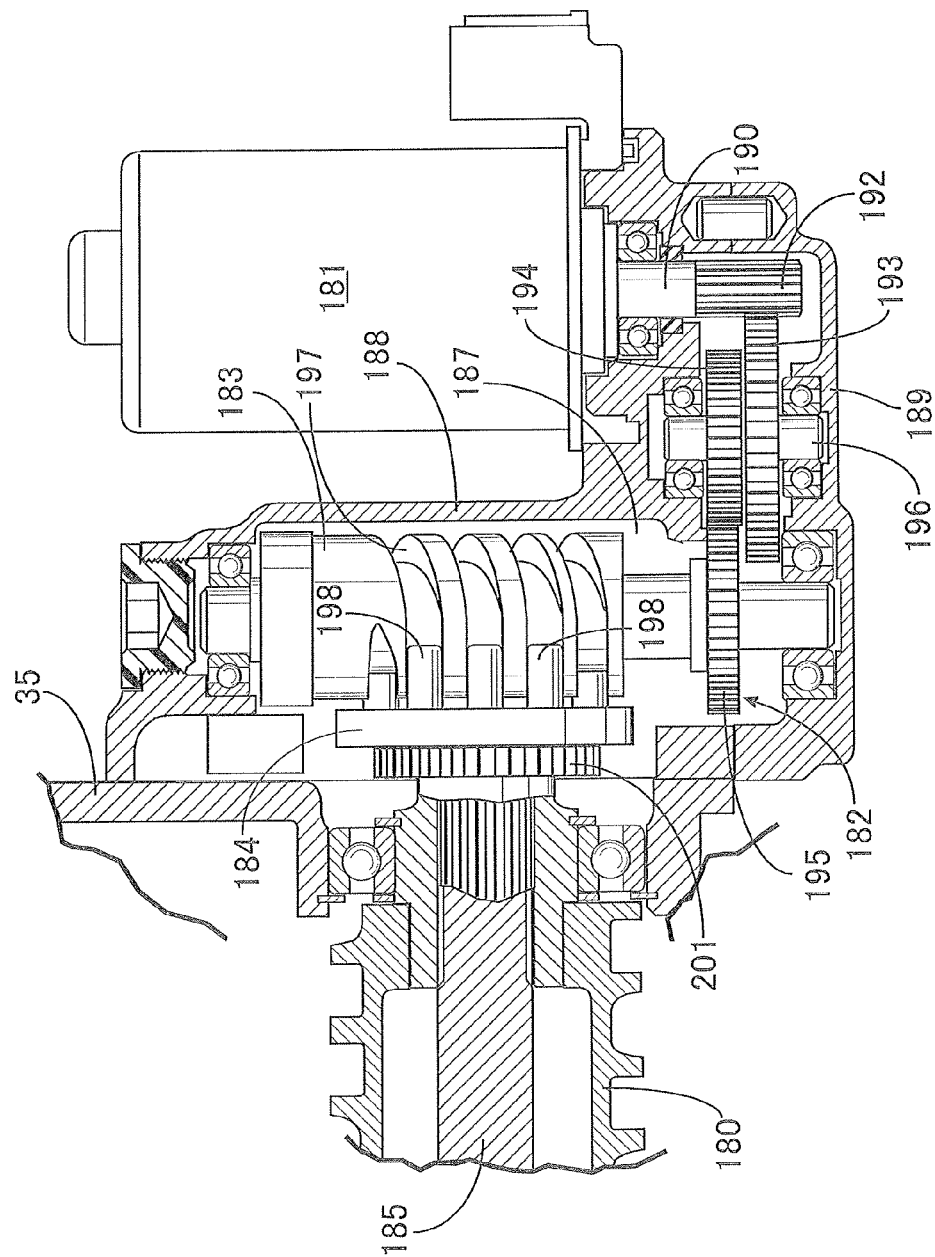
FIG. 11 is a sectional view along line 11-11 in FIG. 10. (first embodiment)

Referring in addition to FIG. 11, power exerted by the shift-drive electric motor 181 is transmitted to the shift drum 180 via a reduction gear mechanism 182, a barrel cam 183, a disk-shaped rotation transmission member 184, a transmission shaft 185, and a lost motion spring 186.

A case member 188 is secured to the left-hand side face of the crankcase 35, the case member 188 forming between itself and the crankcase 35 an operating chamber 187 housing the reduction gear mechanism 182, the barrel cam 183, and the rotation transmission member 184, and a cover member 189 is mounted on the case member 188 so as to block the open end of the case member 188. The shift-drive electric motor 181 is mounted on the case member 188 so that a motor shaft 190 projects into the operating chamber 187.

The gear reduction mechanism 182 is formed from a drive gear 192 provided on the motor shaft 190 of the shift-drive electric motor 181, a first intermediate gear 193 meshing with the drive gear 192, a second intermediate gear 194 rotating together with the first intermediate gear 193, and a driven gear 195 provided on the barrel cam 183 and meshing with the second intermediate gear 194.

The first and second intermediate gears 193 and 194 are provided on a rotating shaft 196 whose opposite end parts are rotatably supported by the case member 188 and the cover member 189, and opposite end parts of the barrel cam 183 are rotatably supported by the case member 188 and the cover member 189.

A helical cam groove 197 is provided on the outer periphery of the barrel cam 183. The rotation transmission member 184 is disposed so as to face the outer periphery of the barrel cam 183 while being capable of rotating around the same axis as the shift drum 180, and a plurality of engagement pins 198 capable of selectively engaging with the cam groove 197 are provided on the rotation transmission member 184 at equal intervals in the peripheral direction. The plurality of engagement pins 198 engage in sequence with the cam groove 197 and are fed in response to rotation of the barrel cam 183, thus transmitting rotational power to the rotation transmission member 184.

One end part of the transmission shaft 185 coaxially and relatively rotatably extending through the shift drum 180 is coaxially and relatively non-rotatably joined to the rotation transmission member 184, the lost motion spring 186 is provided between the other end part of the transmission shaft 185 and the other end part of the shift drum 180, and a pivoting force due to pivoting of the transmission shaft 185 is transmitted to the shift drum 180 via the lost motion spring 186.

In order to detect a pivot position of the shift drum 180, a shift sensor 199 is mounted on the case member 188, and a detection shaft 200 of the shift sensor 199 is rotatably supported by the case member 188.

A third intermediate gear 202 is meshed with a drive gear 201 rotating together with the shift drum 180, and a driven gear 204 provided on the detection shaft 145 is meshed with a fourth intermediate gear 203 rotating together with the third intermediate gear 202.

Referring to FIG. 2, a water pump 208 is mounted on the left-hand side face of the crankcase 35 beneath the generator cover 87, first and second oil pumps 209 and 210 and a scavenging pump 211 are housed within the crankcase 35 coaxially with the water pump 208, and the first and second oil pumps 209 and 210 and the scavenging pump 211 are rotationally operated together with the water pump 208. Rotational power from the driven gear 129 of the primary reduction gear 101 is transmitted to the water pump 208, the first and second oil pumps 209 and 210, and the scavenging pump 211 via an endless chain 212; as shown in FIG. 8 and FIG. 9 a drive sprocket 213 engaged with the driven gear 129 is rotatably supported by the first main shaft 105, and the chain 212 is wound around the drive sprocket 213 and a driven sprocket 214 connected in common to the water pump 208, the first and second oil pumps 209 and 210, and the scavenging pump 211.

Figure 12:
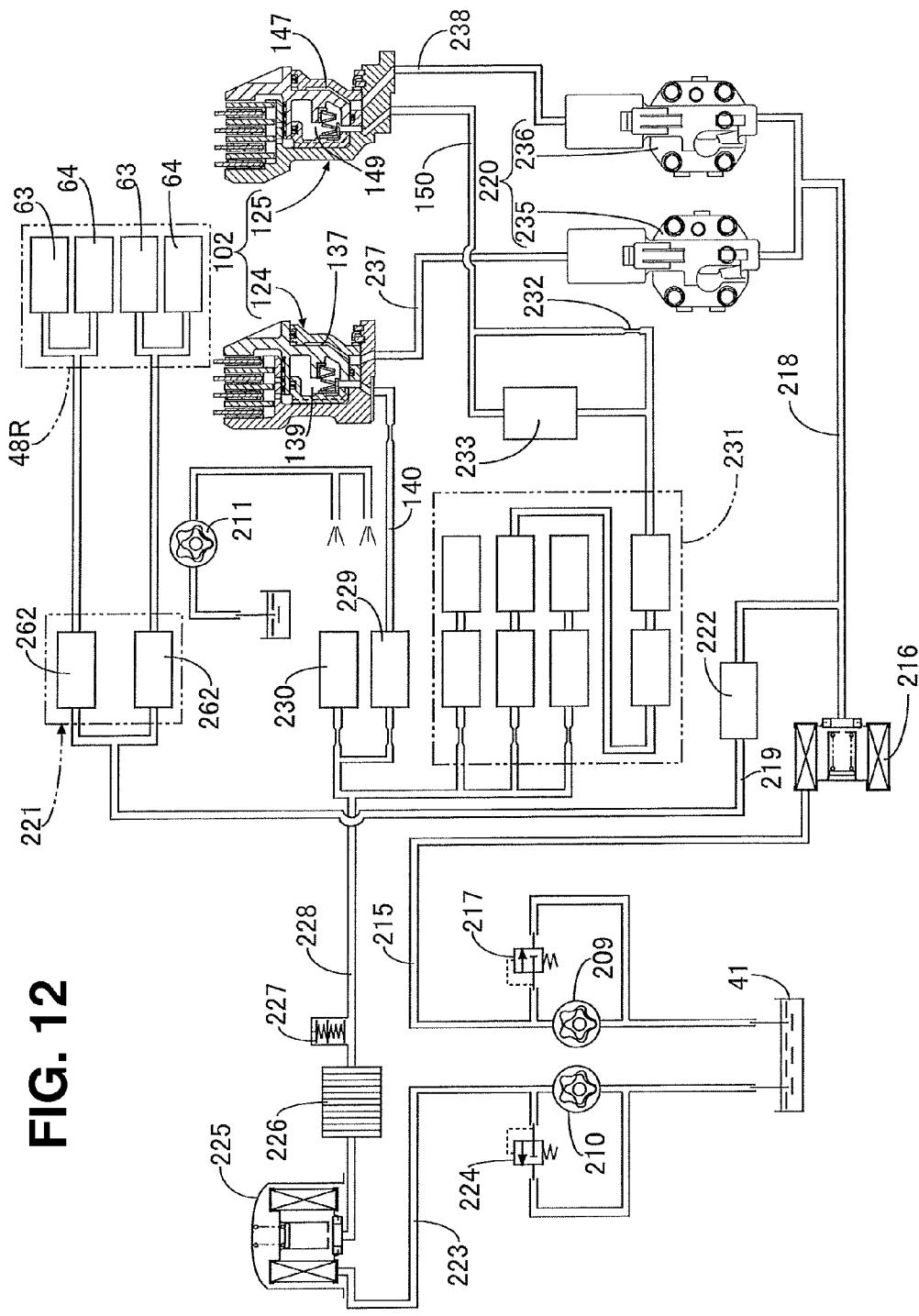
FIG. 12 is a schematic diagram showing the arrangement of a hydraulic system. (first embodiment)

In FIG. 12, the first oil pump 209 discharges hydraulic pressure for switching between connection and disconnection of the first and second clutches 124 and 125 of the clutch device 102 and carrying out switching operations of the intake side valve operation mode change mechanism 63 and the exhaust side valve operation mode change mechanism 64 of the rear bank side valve operating system 48R, oil pumped up from the oil pan 41 and discharged from the first oil pump 209 is connected to the first oil filter 216 via an oil passage 215, and a relief valve 217 is connected to the oil passage 215. Furthermore, oil cleaned by the first oil filter 216 is divided and flows into two, that is, separate first and second branched oil passages 218 and 219, the first branched oil passage 218 is connected to a clutch control device 220 for switching between connection and disconnection of the clutch device 102, the second branched oil passage 219 is connected to a valve operation hydraulic pressure control device 221 for carrying out switching operations of the intake side valve operation mode change mechanism 63 and the exhaust side valve operation mode change mechanism 64 of the rear bank side valve operating system 48R, and a pressure-reducing valve 222 is disposed in the second branched oil passage 219.

The second oil pump 210 supplies lubrication oil to parts of the engine E that are to be lubricated, oil pumped up from the oil pan 41 and discharged from the second oil pump 210 is connected to a second oil filter 225 via an oil passage 223, and a relief valve 224 is connected to a point partway along the oil passage 223. Oil cleaned by the first oil filter 225 is guided to an oil passage 228 in which an oil cooler 226 is disposed, and a pressure sensor 227 is connected to the oil passage 228.

Oil from the oil passage 228 is supplied to a lubrication part 229 around the first and second main shafts 105 and 106 of the gear shift mechanism 103, a lubrication part 230 around the countershaft 107 of the gear shift mechanism 103, and a plurality of lubrication parts 231 of the engine main body 33. Moreover, oil from the lubrication part 229 around the first and second main shafts 105 and 106 is guided to the first oil passage 140 communicating with the canceller chamber 137 of the first clutch 124. Furthermore, oil from the lubrication part 231 is supplied via a constriction 232 to the second oil pathway 150 communicating with the canceller chamber 149 of the second clutch 125, and an electromagnetic open/close valve 233 for rapidly supplying oil to the canceller chamber 149 is connected in parallel to the constriction 232.

Figure 13:
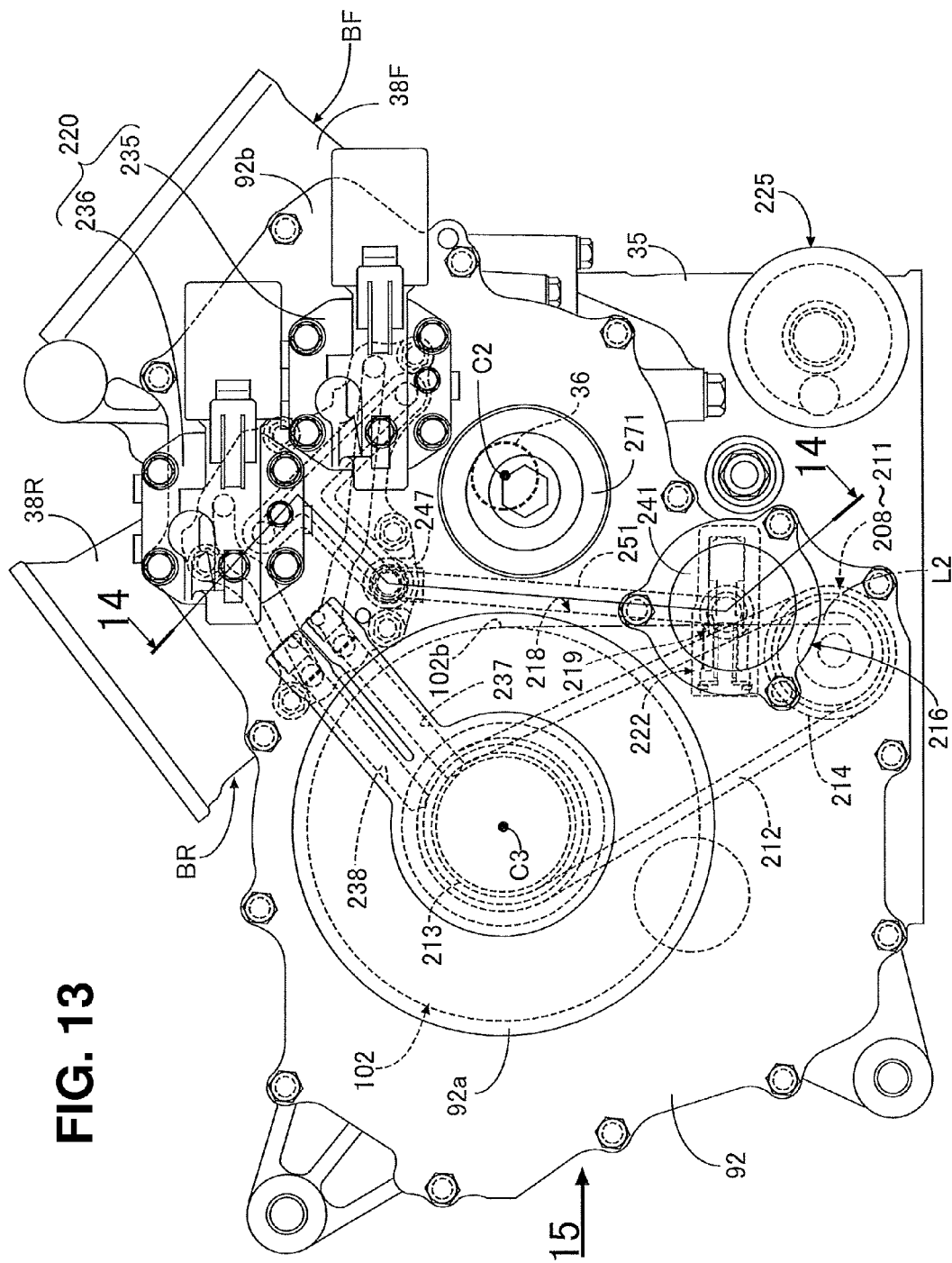
FIG. 13 is an enlarged view of an essential part of FIG. 3. (first embodiment)
Figure 14:
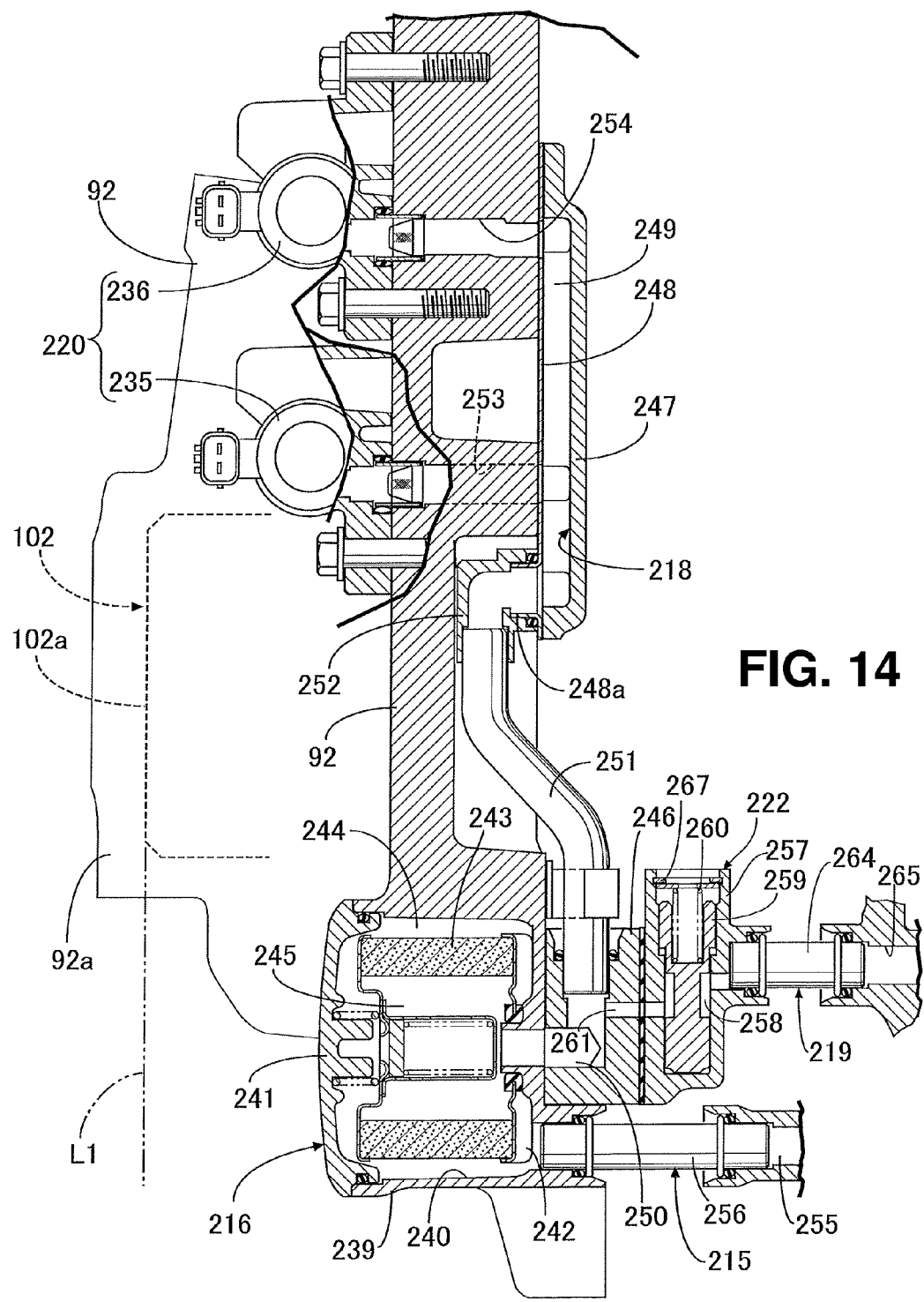
FIG. 14 is a sectional view along line 14-14 in FIG. 13. (first embodiment)

Referring in addition to FIG. 13 and FIG. 14, the clutch control device 220 is formed from a first electromagnetic control valve 235 for switching between the application and release of hydraulic pressure to the first hydraulic chamber 137 of the first clutch 124 and a second electromagnetic control valve 236 for switching between the application and release of hydraulic pressure to the second hydraulic chamber 147 of the second clutch 125, is mounted on an outer face of the clutch cover 92 at a position to the right of the front cylinder block 38F of the front bank BF, and is disposed outside the clutch device 102 when viewed from a direction along the axis of the clutch device 102. That is, the clutch cover 92 is provided with a projecting portion 92a projecting outside so as to house the clutch device 102 at a position corresponding to the clutch device 102, and an extended portion 92b extending from the projecting portion 92a to the right-hand side of the front cylinder block 38F, and the clutch control device 220 is mounted on the extended portion 92b.

Moreover, as clearly shown in FIG. 13, the first and second electromagnetic control valves 235 and 236 forming the clutch control device 220 are disposed at different positions in both the fore-and-aft direction and the vertical direction. Furthermore, among the first and second electromagnetic control valves 235 and 236, the second electromagnetic control valve 236 is disposed above the first electromagnetic control valve 235 and above the crankshaft 36, and at least part of the downwardly disposed first electromagnetic control valve 235, in this embodiment the majority thereof, is disposed in front of the crankshaft 36.

Figure 15:
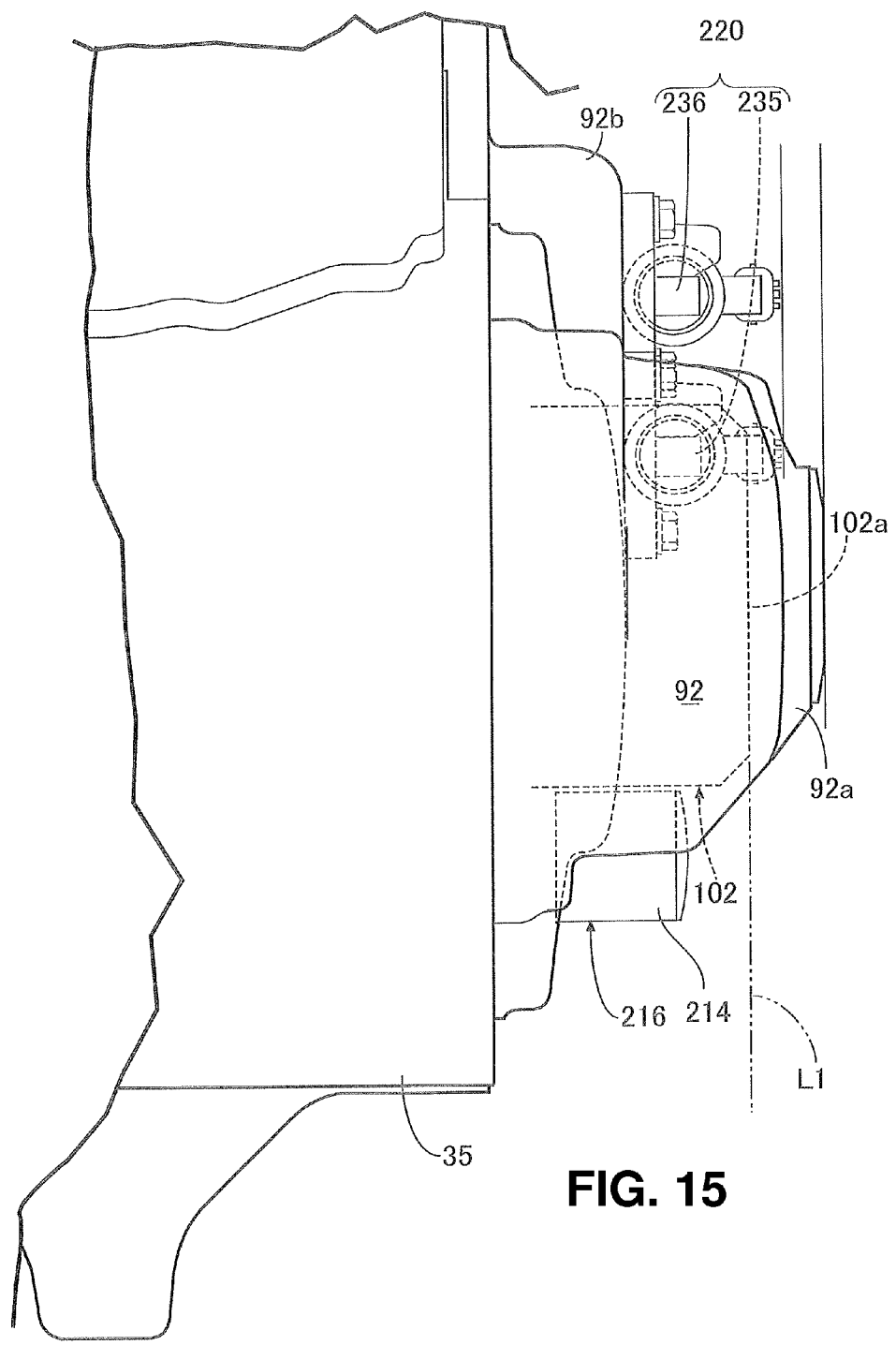
FIG. 15 is a view from arrow 15 in FIG. 13. (first embodiment)

As shown in FIG. 15, the clutch device 102 is mounted on an outer face of the extended portion 92b of the clutch cover 92 so as to be positioned inside the outermost end of the clutch cover 92, that is, the extremity of the projecting portion 92a.

Provided in the clutch cover 92 are an oil passage 237 providing communication between the first electromagnetic control valve 235 and the first oil passage 154 communicating with the first hydraulic chamber 137 of the first clutch 124, and an oil passage 238 providing communication between the second electromagnetic control valve 236 and the second oil passage 157 communicating with the second hydraulic chamber 147 of the second clutch 125.

Referring to FIG. 14, the first oil filter 216 is disposed on the side opposite to the side stand 34 in the width direction of the vehicle body frame F, and is disposed on the clutch cover 92 between an axis C2 of the crankshaft 36 and an axis C3 of the clutch device 102 and beneath these axes C2, C3.

A filter case 239 of the first oil filter 216 projects outward from the crankcase 35 of the engine main body 33, has a cylindrical shape forming a bottomed housing hole 240 having an open outer end, and is formed integrally with the clutch cover 92, and a cover member 241 closing the outer end opening of the housing hole 240 is secured to the filter case 239.

A cylindrical filter material 243 is supported on a support frame 242 interposed between an inner end closed part of the housing hole 240 and the cover member 241 and housed in the filter case 239. An annular uncleaned chamber 244 is formed around the filter material 243, and a cleaned chamber 245 is formed within the filter material 243.

The first oil filter 216 is disposed, when viewed from a direction along the axis of the clutch device 102, outside the clutch device 102 and beneath the crankshaft 36 at a position inside the outermost end of the projecting portion 92a of the clutch cover 92 while at least part of the filter material 243, which is a constituent element thereof, projects from the outer face of the clutch cover 92 in a direction along the axis of the crankshaft 36 and, in this embodiment, as shown in FIG. 2, it is disposed forward and obliquely downward of the clutch device 102.

As clearly shown in FIG. 13, the first oil filter 216 is provided on the clutch cover 92 so that, viewed from the side, part thereof overlaps the water pump 208, the first and second oil pumps 209 and 210, and the scavenging pump 211.

The first oil filter 216 is inside a vertical line L1 passing through an axially outer end 102a of the clutch device 102 as shown in FIG. 14 and FIG. 15 when viewed in a direction perpendicular to the axes of the crankshaft 36 and the clutch device 102, and is disposed so that a vertical line L2 passing through a frontmost end 102b of the clutch device 102, as shown in FIG. 13 in a side view in a direction along the axes of the crankshaft 36 and the clutch device 102, passes through the first oil filter 216. The first oil filter 216 is thereby disposed inside the axially outer end 102a of the clutch device 102 while overlapping part of the clutch device 102 in plan view.

A connection member 246 is secured to an inner face of the clutch cover 92 in a portion corresponding to the first oil filter 216. On the other hand, an oil passage-forming member 247 is secured to the inner face of the clutch cover 92 in the vicinity of the clutch control device 220 with a flat plate-shaped dividing wall member 248 interposed between itself and the clutch cover 92, and an oil passage 249 is formed between the oil passage-forming member 247 and the dividing wall member 248. The connection member 246 forms a connection oil passage 250 communicating with the cleaned chamber 245 of the first oil filter 216, and one end of a connection tube 251 extending toward the oil passage-forming member 247 side is liquid-tightly fitted into the connection oil passage 250. The other end of the connection tube 251 is fitted into a coupling member 252, and the coupling member 252 is liquid-tightly fitted into a cylindrical tubular fitting portion 248a provided on the dividing wall member 248. Oil passages 253 and 254 providing communication between each of the first and second electromagnetic control valves 235 and 236 and the oil passage 249 between the oil passage-forming member 247 and the dividing wall member 248 are provided in the clutch cover 92.

Therefore, the cleaned chamber 245 of the first oil filter 216 is connected to the connection oil passage 250, the connection tube 251, the coupling member 252, the oil passage 249, and the oil passages 253 and 254; the connection oil passage 250, the connection tube 251, the coupling member 252, the oil passage 249, and the oil passages 253 and 254 form the first branched oil passage 218, which has been explained by reference to FIG. 12.

The oil passage 215 providing a connection between the uncleaned chamber 244 of the first oil filter 216 and a discharge outlet of the first oil pump 209 is formed from an oil passage 255 provided in the crankcase 35 so as to communicate with the discharge outlet of the first oil pump 209, and a connection tube 256 providing a connection between the oil passage 255 and the uncleaned chamber 244, and opposite ends of the connection tube 256 are liquid-tightly fitted into an end part of the oil passage 255 and the clutch cover 92.

A valve housing 257 of the pressure-reducing valve 222 is joined to the clutch cover 92 together with the connection member 246 so that the connection member 246 is interposed between the valve housing 257 and an inner face of the clutch cover 92. The pressure-reducing valve 222 is formed by slidably fitting a valve body 259 so as to form an oil chamber 258 between itself and one end of the valve housing 257, and providing a spring 260 between the valve body 259 and a spring-receiving member 267 provided on the other end of the valve housing 257, the spring 260 urging the valve body 259 toward the side that reduces the volume of the oil chamber 258.

A passage 261 is provided in the connection member 246 and the valve housing 257, the passage 261 providing a connection between the oil chamber 258 and an oil passage 250 within the connection member 246, and this passage 261 becomes a branching point for the first and second branched oil passages 218 and 219.

The pressure-reducing valve 222 reduces the hydraulic pressure of the oil chamber 258 to a constant level by means of the valve body 259 reciprocatingly sliding so as to balance the hydraulic pressure force due to the hydraulic pressure of the oil chamber 258 against the spring force of the spring 260, and the hydraulic pressure reduced by the pressure-reducing valve 222 is guided toward the valve operation hydraulic pressure control device 221 side.

Due to such an arrangement of the pressure-reducing valve 222, the pressure-reducing valve 222 is disposed in proximity to the first oil filter 216 and, moreover, as clearly shown in FIG. 13, at least part of the pressure-reducing valve 222 overlaps the first oil filter 216 when viewed from the axial direction of the first oil filter 216.

The valve operation hydraulic pressure control device 221 is formed from a pair of electromagnetic control valves 262 and 262 individually corresponding to each cylinder of the two cylinders of the rear bank BR, and is mounted on the left-hand side face of the rear cylinder head 39R of the rear bank BR.

One electromagnetic control valve 262 controls the hydraulic pressure of the intake side and exhaust side valve operation mode change mechanisms 63 and 64 in one of the two cylinders, and the other electromagnetic control valve 262 controls the hydraulic pressure of the intake side and exhaust side valve operation mode change mechanism 63 and 64 in the other cylinder.

Oil whose pressure has been reduced by the pressure-reducing valve 222 is guided to the valve operation hydraulic pressure control device 221 via a connection tube 264 having one end connected to the valve housing 257 and extending to the side away from the clutch cover 92, an oil passage 265 connected to the other end of the connection tube 264 and provided in the crankcase 35 so as to extend up to the left-hand side face of the crankcase 35, the crankcase 35, and an oil passage 266 (see FIG. 2) provided in the rear cylinder block 38R and the rear cylinder head 39R on the left-hand face side and providing a connection between the oil passage 265 and the valve operation hydraulic pressure control device 221, and the second branched oil passage 219 in which the pressure-reducing valve 222 is disposed is formed from the connection tube 264 and the oil passages 265 and 266.

The second oil filter 225 is mounted on the right-hand side face of the crankcase 35 further forward than the first oil filter 216.

The operation of this embodiment is now explained. The shift-drive electric motor 181 for controlling the drive of the shift operation of the gear shift mechanism 103 is mounted on the left-hand side face of the crankcase 35, the degree of freedom in the layout of functional components disposed around the crankcase 35 can be enhanced, and the ease of maintenance of the shift-drive electric motor 181 can be enhanced by making it easy to access the shift-drive electric motor 181 from the outside of the power unit P. Furthermore, since the operation axis C1 of the shift-drive electric motor 181 is disposed on a plane perpendicular to the axial direction of the gear shift mechanism 103, the amount of projection of the shift-drive electric motor 181 outward from the crankcase 35 can be minimized despite the shift-drive electric motor 181 being mounted on the left-hand side face of the crankcase 35.

Moreover, the shaft end of the countershaft 107 of the gear shift mechanism 103 is covered by the first and second gear covers 116 and 117 detachably mounted on the left-hand side face of the crankcase 35, and since the shift-drive electric motor 181 is mounted on the left-hand side face of the crankcase 35 at a position above the first and second gear covers 116 and 117 and inside the first and second gear covers 116 and 117 along the axis of the countershaft 107, it is possible for the shift-drive electric motor 181 actuator to be protected from flying stones, muddy water, etc. from below by the first and second gear covers 116 and 117, and it is unnecessary to employ a component exclusively used for protecting the shift-drive electric motor 181, thus reducing the number of components. Moreover, since it is unnecessary to provide a boss, etc. for mounting a protecting cover around the shift-drive electric motor 181, any restriction on layout of other components due to the boss, etc. can be eliminated, thus increasing the degree of freedom in layout for the other components.

Furthermore, although the generator cover 87 is mounted on the left-hand side face of the crankcase 35, since the shift-drive electric motor 181 is positioned to the rear of the generator cover 87 and inside the outer end of the generator cover 87 along the axis of the crankshaft 36, the shift-drive electric motor 181 can be disposed by utilizing effectively a space around the generator cover 87 projecting from the left-hand side face of the crankcase 35, and it is possible to prevent the power unit P from increasing in size, due to the arrangement of the shift-drive electric motor 181, in a direction along the axis of the crankshaft 36. Furthermore, the generator cover 87 can protect the shift-drive electric motor 181 from flying stones, muddy water, etc. from the front, and it is unnecessary to employ a component exclusively used for protecting the shift-drive electric motor 181, thus reducing the number of components. Moreover, since it is unnecessary to provide a boss, etc. for mounting a protecting cover around the shift-drive electric motor 181, any restriction on layout of other components due to the boss, etc. can be eliminated, thus increasing the degree of freedom in layout for the other components.

Furthermore, since the operation axis C1 of the shift-drive electric motor 181 is tilted in the vertical direction, when detaching the shift-drive electric motor 181, the generator cover 87, which is present in front thereof, does not interfere therewith, thus enhancing the ease of maintenance.

The clutch cover 92 housing the clutch device 102 is joined to the right-hand side face of the crankcase 35, and since the clutch control device 220 for controlling switching between connection and disconnection of the clutch device 102 is mounted on the outer face of the clutch cover 92 so as to be disposed on the right-hand side to the front cylinder block 38F of the front bank BF, it is easy for air flow to impinge on the clutch control device 220, thus enhancing the cooling performance and avoiding any increase in the fore-and-aft length of the engine main body 33. Moreover, since it is relatively rare to dispose vehicle-forming components such as an intake system component or a vehicle body frame F in a portion corresponding to the outer face of the clutch cover 92, mounting the clutch control device 220 on the outer face of the clutch cover 92 can improve the degree of freedom in design of intake system components, the vehicle body frame F, etc.

Moreover, the clutch device 102 is arranged as a twin type having the first and second clutches 124 and 125, and the clutch control device 220 has the first and second electromagnetic control valves 235 and 236 that individually control connection and disconnection of the first and second clutches 124 and 125. Since the first and second electromagnetic control valves 235 and 236 are disposed at different positions in the fore-and-aft and vertical directions, it is easy for air flow to impinge on both the first and second electromagnetic control valves 235 and 236, thus giving excellent cooling performance.

Moreover, among the first and second electromagnetic control valves 235 and 236, the second electromagnetic control valve 236 is disposed above the first electromagnetic control valve 235 and above the crankshaft 36, and since at least part of the first electromagnetic control valve 235 (the majority thereof in this embodiment) is disposed in front of the crankshaft 36, the clutch control device 220 is disposed in a space extending from above the crankshaft 36 to the front thereof, this space being larger than the space between the crankshaft 36 and the clutch device 102, the crankshaft 36 and the clutch device 102 can be disposed in a small gap between the axes, and it is easy for air flow to impinge on the first and second electromagnetic control valves 235 and 236.

Since the clutch control device 220 is disposed inside the outermost end of the clutch cover 92, projection of the clutch control device 220 to the right-hand side of the crankcase 35 can be minimized, and it is unnecessary to take into consideration a bank angle affected by the arrangement of the clutch control device 220.

Furthermore, since the clutch control device 220 is disposed outside the clutch device 102 when viewed from a direction along the axis of the clutch device 102, it is possible to minimize any increase in the dimensions in the left-and-right direction of the power unit P by mounting the clutch control device 220 on the outer face of the clutch cover 92 while avoiding the clutch device 102, which projects the most to the right-hand side of the crankcase 35.

Moreover, since the oil passages 237 and 238 providing a connection between the hydraulic clutch device 102 and the clutch control device 220 for controlling the hydraulic pressure acting on the clutch device 102 are provided in the clutch cover 92, the oil passages 237 and 238 can be shortened and simplified, and the ease of maintenance of the mechanism for controlling the clutch device 102 can be improved.

The first oil filter 216 is provided on the clutch cover 92, and the first oil filter 216 is disposed beneath the axes C2 and C3 of the crankshaft 36 and the clutch device 102 and between the axes C2 and C3. It is therefore possible to dispose the first oil filter 216 by utilizing effectively the space formed beneath and between the crankshaft 36 and the clutch device 102, and it is possible to guarantee the degree of freedom in design of components that are present above the crankshaft 36, such as the inner diameter of the cylinder bore 42 and the arrangement of the timing transmission mechanisms 95 and 98, which are present above the crankshaft 36. Moreover, since there is extra space inside the engine main body 33 at a position beneath and between the axis C2 of the crankshaft 36 and the axis C3 of the clutch device 102, it is possible to suppress projection of the first oil filter 216 in a direction along the axis of the crankshaft 36 without imposing any restriction on the degree of freedom in terms of the arrangement of other components. Furthermore, since the first oil filter 216 is beneath the crankshaft 36, the center of gravity of the motorcycle can be lowered.

Since the first oil filter 216 is disposed inside the axially outer end 102a of the clutch device 102 so as to overlap part of the clutch device 102 in plan view, it is possible to avoid the power unit P increasing in size in the axial direction of the crankshaft 36 due to the first oil filter 216 being mounted, and it is possible to prevent projection of the first oil filter 216 from the clutch cover 92 from affecting the bank angle.

Furthermore, since the first oil filter 216 is disposed beneath the crankshaft 36 and outside the clutch device 102 when viewed in a direction along the axis of the clutch device 102 while at least part of the filter material 243, which is a constituent element of the first oil filter 216, projects outside the outer face of the clutch cover 92 in a direction along the axis of the crankshaft 36, it becomes easy for air flow to impinge on the first oil filter 216, thus enhancing the cooling performance of the first oil filter 216.

Moreover, since the first oil filter 216 is disposed so that, viewed from the side, part thereof overlaps the water pump 208, the first and second oil pumps 209 and 210, and the scavenging pump 211, it is possible to dispose the first oil pump 209 and the first oil filter 216 in proximity to each other, thus shortening and simplifying the oil passage 215, which provides a connection between the first oil pump 209 and the first oil filter 216.

Furthermore, since the oil passages 237 and 238 providing connections between the clutch device 102 and the clutch control device 220 for controlling the hydraulic pressure acting on the clutch device 102 are provided in the clutch cover 92, the clutch control device 220 and the oil passages 237 and 238 providing connections between the clutch device 102 and the clutch control device 220 are disposed on the clutch cover 92 in a concentrated manner, thereby shortening and simplifying the oil passages 237 and 238 and enhancing the ease of maintenance of the mechanism for controlling the clutch device 102.

Moreover, since the first oil filter 2126 is disposed on the side opposite to the side stand 34 in the width direction of the vehicle body frame F, it is possible to enhance the ease of maintenance, etc. of the first oil filter 216 in a state in which the motorcycle is parked standing on the side stand 34.

Furthermore, the pressure-reducing valve 222 is disposed in the second branched oil passage 219, which provides a connection between the first oil filter 216 and the valve operation hydraulic pressure control device 221; since this pressure-reducing valve 222 is disposed in proximity to the first oil filter 216, it is possible to dispose the pressure-reducing valve 222 and the first oil filter 216 compactly while efficiently using necessary hydraulic pressure.

Moreover, the substantially cylindrical filter case 239 of the first oil filter 216 is mounted on the crankcase 35 so as to project outside the crankcase 35, and since at least part of the pressure-reducing valve 222 is disposed so as to overlap the first oil filter 216 when viewed in the axial direction of the filter case 239 it is possible to dispose the pressure-reducing valve 222 and the first oil filter 216 in closer vicinity to each other, thus further contributing to making the power unit P compact.

Moreover, since the first oil filter 216 and the pressure-reducing valve 222 are provided on the clutch cover 92 mounted on the crankcase 35, the ease of assembly can be enhanced. It is also easy to separately make, using the same engine main body 33, the power unit P having the pressure-reducing valve 222 and the first oil filter 216 and a power unit that does not have a pressure-reducing valve and an oil filter.

Since the discharge outlet of the first oil pump 209 is connected in common to the intake side and exhaust side valve operation mode change mechanisms 63 and 64 and the clutch device 102, it is possible to suppress any increase in the bulk of the power unit P, make the hydraulic system associated with the intake side and exhaust side valve operation mode change mechanism 63 and 64 and the clutch device 102 compact, and form the power unit P suitable for a motorcycle.

Furthermore, since, among the clutch control device 220 and the valve operation hydraulic pressure control device 221, which are hydraulic pressure control mechanisms, the pressure-reducing valve 222 is disposed at a point partway along the second branched oil passage 219 communicating with the valve operation hydraulic pressure control device 221, it is possible to appropriately and efficiently control the hydraulic pressure of the clutch control device 220 and the valve operation hydraulic pressure control device 221.

Moreover, since, among the first and second branched oil passages 218 and 219 branching from the first oil pump 209 and communicating with the clutch control device 220 and the valve operation hydraulic pressure control device 221, the pressure-reducing valve 222 is disposed at a point partway along the second branched oil passage 219, the hydraulic system can be arranged appropriately and efficiently by applying a suitable hydraulic pressure to each of the clutch control device 220 and the valve operation hydraulic pressure control device 221.

The intake side and exhaust side valve operation mode change mechanisms 63 and 64 can carry out switching by means of a lower hydraulic pressure than that for the clutch device 102, and since the discharge hydraulic pressure from the first oil pump 209 is reduced by means of the pressure-reducing valve 222 and supplied it is possible to make a suitable hydraulic pressure act on each of the intake side and exhaust side valve operation mode change mechanisms 63 and 64 and the clutch device 102.

An embodiment of the present invention is explained above, but the present invention is not limited to the above-mentioned embodiment and may be modified in a variety of ways as long as the modifications do not depart from the present invention described in Claims.

The invention claimed is:

1. A power unit for a small-sized vehicle comprising a valve operating system (48R) equipped with a hydraulic valve operation mode change mechanism (63, 64) capable of changing the operational mode of an engine valve (44, 45), and a clutch device (102) disposed between a crankshaft (36) and a shift mechanism (103) so as to switch hydraulically between connection and disconnection of power transmission, characterized in that a discharge outlet of one oil pump (209) driven by power transmission from the crankshaft (36) is connected in common to the valve operation mode change mechanism (63, 64) and the clutch device (102).

2. The power unit for a small-sized vehicle according to claim 1, wherein among two branched oil passages (218, 219) branching from the discharge outlet of the oil pump (209) and connected to the valve operation mode change mechanism (63, 64) and the clutch device (102) respectively, a pressure-reducing valve (222) is disposed at a point partway along the branched oil passage (219) connected to the valve operation mode change mechanism (63, 64).

3. The power unit for a small-sized vehicle according to claim 2, wherein an oil filter (216) is disposed between the discharge outlet of the oil pump (209) and the pressure-reducing valve (222), and the pressure-reducing valve (222) is disposed in proximity to the oil filter (216).

4. The power unit for a small-sized vehicle according to claim 3, wherein a filter case (239) of the oil filter (216) is formed into a substantially cylindrical shape, and at least part of the pressure-reducing valve (222) is disposed so as to overlap the oil filter (216) when viewed from the axial direction of the filter case (239) mounted on the engine main body (33) so as to project outward from the engine main body (33).

5. The power unit for a small-sized vehicle according to claim 3, wherein the oil filter (216) and the pressure-reducing valve (222) are mounted on one cover member (92) mounted on the engine main body (33).

* * * * *